US011770762B2

United States Patent
Kim et al.

(10) Patent No.: US 11,770,762 B2
(45) Date of Patent: Sep. 26, 2023

(54) PROCESSING NSSAA FAILURE CAUSED BY NETWORK ERROR OR TIMEOUT

(71) Applicant: LG ELECTRONICS INC., Seoul (KR)

(72) Inventors: Sunhee Kim, Seoul (KR); Hyunsook Kim, Seoul (KR); Sangmin Park, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/713,079

(22) Filed: Apr. 4, 2022

(65) Prior Publication Data

US 2022/0240174 A1    Jul. 28, 2022

Related U.S. Application Data

(63) Continuation of application No. PCT/KR2021/010735, filed on Aug. 12, 2021.

(30) Foreign Application Priority Data

Aug. 13, 2020    (KR) .................. 10-2020-0101756

(51) Int. Cl.
*H04W 48/18* (2009.01)
*H04L 67/02* (2022.01)
(Continued)

(52) U.S. Cl.
CPC ............. *H04W 48/18* (2013.01); *H04L 67/02* (2013.01); *H04W 12/06* (2013.01); *H04W 60/04* (2013.01)

(58) Field of Classification Search
CPC ........... D21J 1/08; H04L 67/02; H04W 12/06; H04W 4/50; H04W 48/02; H04W 48/18;
(Continued)

(56) References Cited

U.S. PATENT DOCUMENTS 11,316,629 B2 * 4/2022 Jung ....................... G06F 21/77
2019/0342851 A1    11/2019 Shan et al.
(Continued)

FOREIGN PATENT DOCUMENTS

WO    2020/146211 A1    7/2020
WO    WO-2022021346 A1 *    2/2022

OTHER PUBLICATIONS

ZTE et al., "Deleting Editors note regarding indefinite wait at the UE for NSSAA completion", C1-203894, 3GPP TSG-CT WG1 Meeting #124-e, Electronic Meeting, Jun. 2-10, 2020, see pp. 1-38.
(Continued)

*Primary Examiner* — Charles N Appiah
*Assistant Examiner* — Nicole M Louis-Fils
(74) *Attorney, Agent, or Firm* — BRYAN CAVE LEIGHTON

(57) ABSTRACT

Provided are a method and a device for processing a network slice-specific authentication and authorization (NSSAA) failure caused by a network error or timeout. An access and mobility management function (AMF): starts an NSSAA procedure for an NSSAA function (NSSAAF) and single network slice selection assistance information (S-NSSAI); and restarts the NSSAA procedure after waiting for a certain period, on the basis that the Hypertext Transfer protocol (HTTP) status code "504 Gateway Timeout" is received from the NSSAAF, and/or a response regarding the NSSAA procedure could not be received from the NSSAAF.

9 Claims, 14 Drawing Sheets

(51) Int. Cl.
*H04W 12/06* (2021.01)
*H04W 60/04* (2009.01)

(58) Field of Classification Search
CPC .............. H04W 60/04; Y10T 442/2213; Y10T 442/2254; Y10T 442/2262; Y10T 442/2557
See application file for complete search history.

(56) References Cited

U.S. PATENT DOCUMENTS

| | | | |
|---|---|---|---|
| 2020/0162919 A1* | 5/2020 | Velev | H04W 12/084 |
| 2020/0267554 A1* | 8/2020 | Faccin | H04L 63/101 |
| 2022/0007184 A1* | 1/2022 | Ferdi | H04W 12/08 |
| 2022/0110050 A1* | 4/2022 | Won | H04W 60/00 |

OTHER PUBLICATIONS

ZTE, "Update References", C4-204099, 3GPP TSG-CT WG4 Meeting #99e, E-Meeting, Aug. 18-28, 2020, see pp. 3-5; and figure 5.2.2.2.1-1.

Ericsson, "NSSAA pending, prevent UE to wait indefinitely", C1-198420, 3GPP TSG-CT WG1 Meeting #121, Reno (NV), USA, Nov. 11-15, 2019, see pp. 1-3.

Apple, "Reactivation of previously rejected S-NSSAI due to NSSAA failure", C1-204096, 3GPP TSG-CT WG1 Meeting #124-e, Electronic Meeting, Jun. 2-10, 2020, see pp. 1-4.

Section 4.2.2.2 of 3GPP TS 23.502 V16.3.0 (Dec. 2019).

Section 4.6, Section 4.6.2.2 and Section 5.5.1.2.5 of 3GPP TS 24.501 V16.4.1, (Mar. 2020).

Section 4.2.9 of 3GPP TS 23.502 V16.4.0, (Mar. 2020).

Section 5.2.2.2 of 3GPP TS 29.526 V1.0.0, (Jun. 2020).

* cited by examiner

PROCESSING NSSAA FAILURE CAUSED BY NETWORK ERROR OR TIMEOUT

This application is a Continuation Application of International Application No. PCT/KR2021/010735, filed on Aug. 12, 2021, which claims the benefit of and priority to Korean Application No. 10-2020-0101756, filed on Aug. 13, 2020, the contents of which are all hereby incorporated by reference herein in their entirety.

TECHNICAL FIELD

The present disclosure relates to handling of Network Slice-Specific Authentication and Authorization (NSSAA) failures due to network error or timeout.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A network slice refers to a logical network that provides specific network capabilities and network characteristics. More specifically, a network slice is a network structure that enables multiplexing of virtualized independent logical networks in the same physical network infrastructure. Each network slice is a separate end-to-end network tailored to meet the various requirements requested by a specific application. The network slice enables various services to be provided to various terminals with different properties.

SUMMARY

A Network Slice-Specific Authentication and Authorization (NSSAA) procedure may be performed for a specific network slice. The NSSAA procedure may be performed through AAA Server (AAA-S). At this time, if there is no response from AAA-S by a failure of the NSSAA procedure being occurred due to a network error in AAA-S, etc., it is difficult for a User Equipment (UE) to know for what reason the NSSAA procedure has failed, and it is also unclear how the NSSAA procedure can be restarted in the future.

In an aspect, a method performed by an Access and mobility Management Function (AMF) configured to operate in a wireless communication system is provided. The method comprises initiating a Network Slice-Specific Authentication and Authorization (NSSAA) procedure for Single Network Slice Selection Assistance Information (S-NSSAI) with a Network Slice-Specific Authentication and Authorization Function (NSSAAF), and based on receiving a HyperText Transfer Protocol (HTTP) status code "504 Gateway Timeout" from the NSSAAF and/or not receiving a response for the NSSAA procedure from the NSSAF, re-initiating the NSSAA procedure after waiting for certain time.

The present disclosure can have various advantageous effects.

For example, even if an NSSAA failure occurs due to a network error in AAA-S, etc., the AMF can start the NSSAA procedure again.

For example, in case of a network error, data transmission can be performed for a corresponding network slice.

For example, even if the NSSAA procedure fails once, the S-NSSAI can be used again after a certain period of time.

For example, even if the UE does not move to a new PLMN, data can be transmitted again using the S-NSSAI that has failed once.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
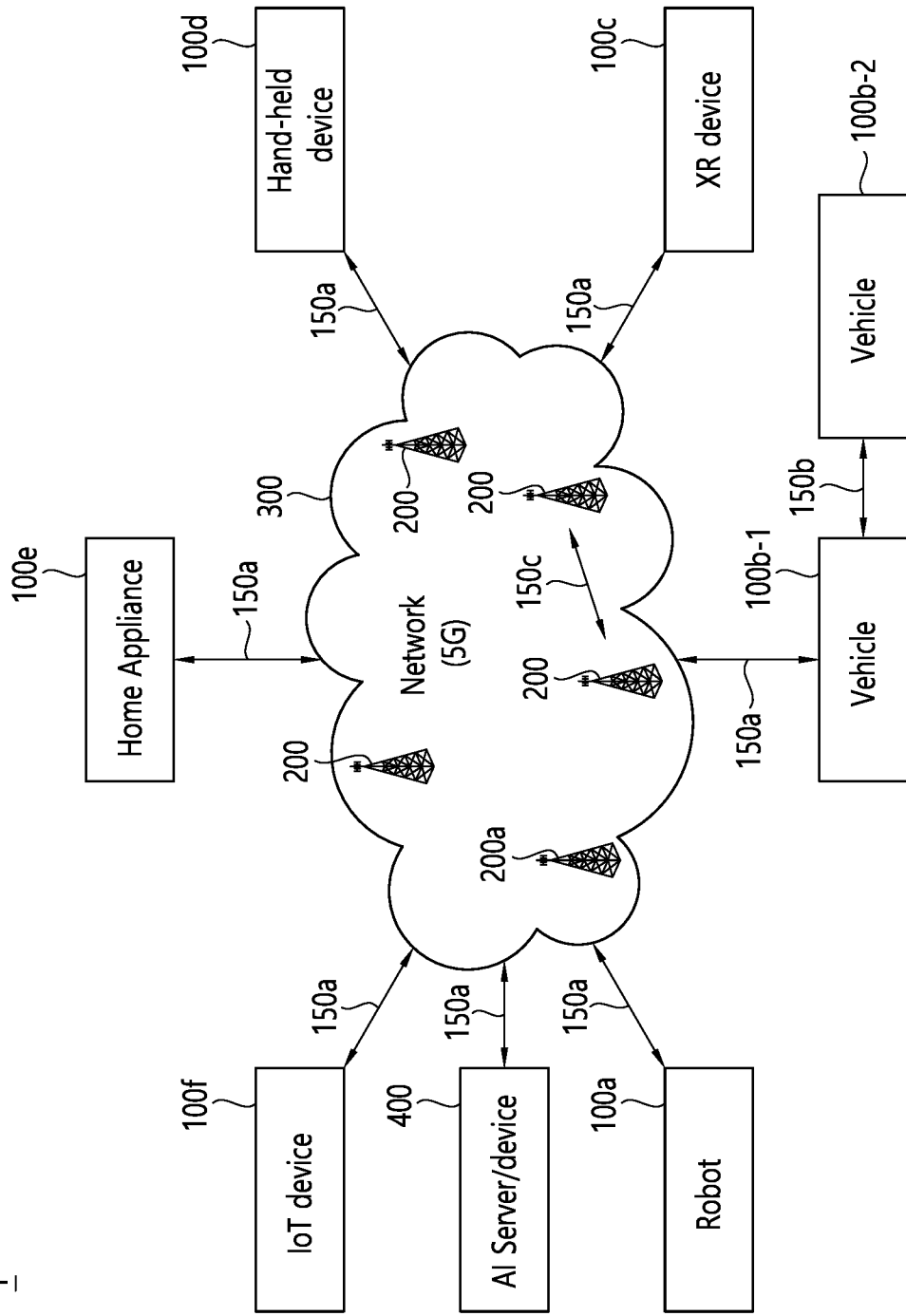
FIG. 1 shows an example of a communication system to which implementations of the present disclosure are applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure are applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (JAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
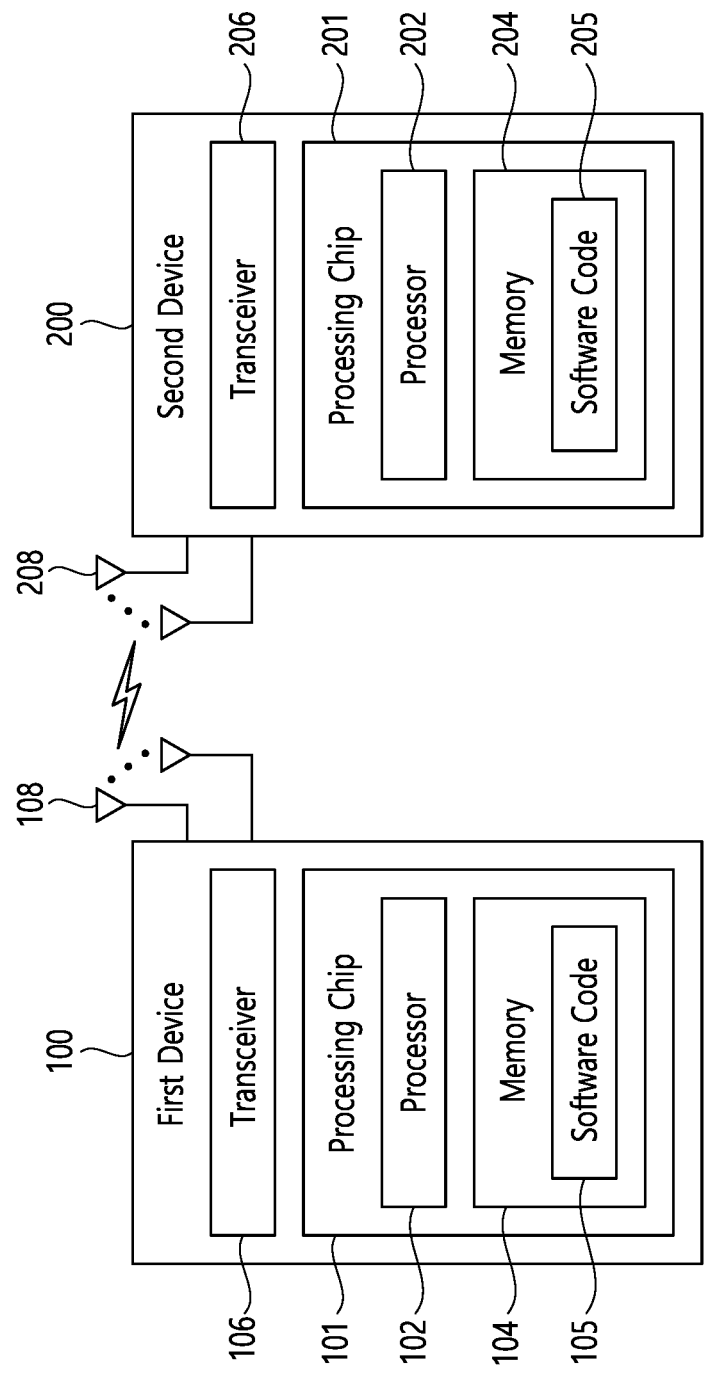
FIG. 2 shows an example of wireless devices to which implementations of the present disclosure are applied.

FIG. 2 shows an example of wireless devices to which implementations of the present disclosure are applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
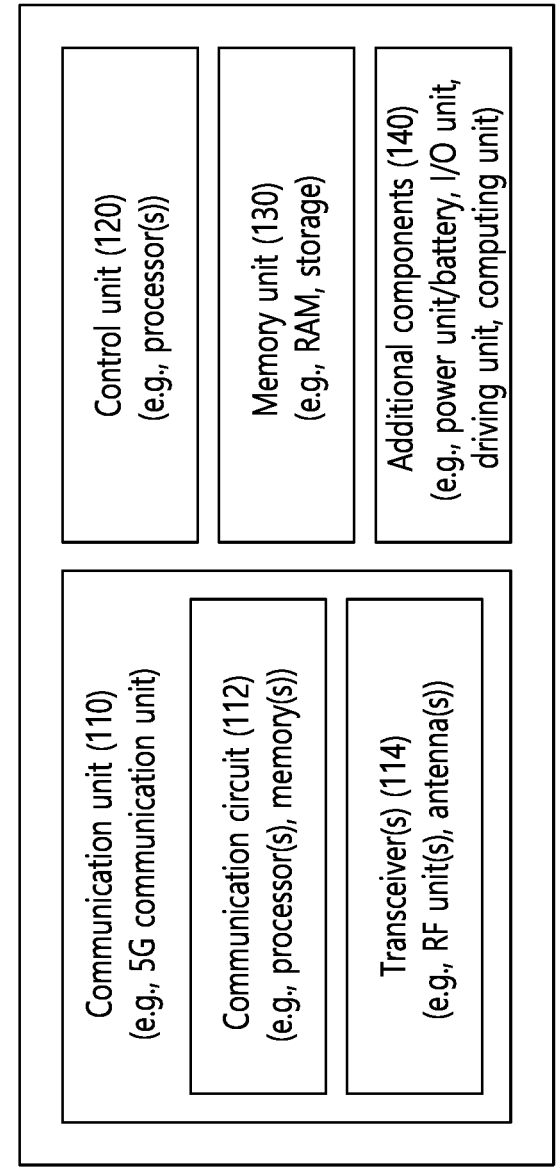
FIG. 3 shows an example of a wireless device to which implementations of the present disclosure are applied.

FIG. 3 shows an example of a wireless device to which implementations of the present disclosure are applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
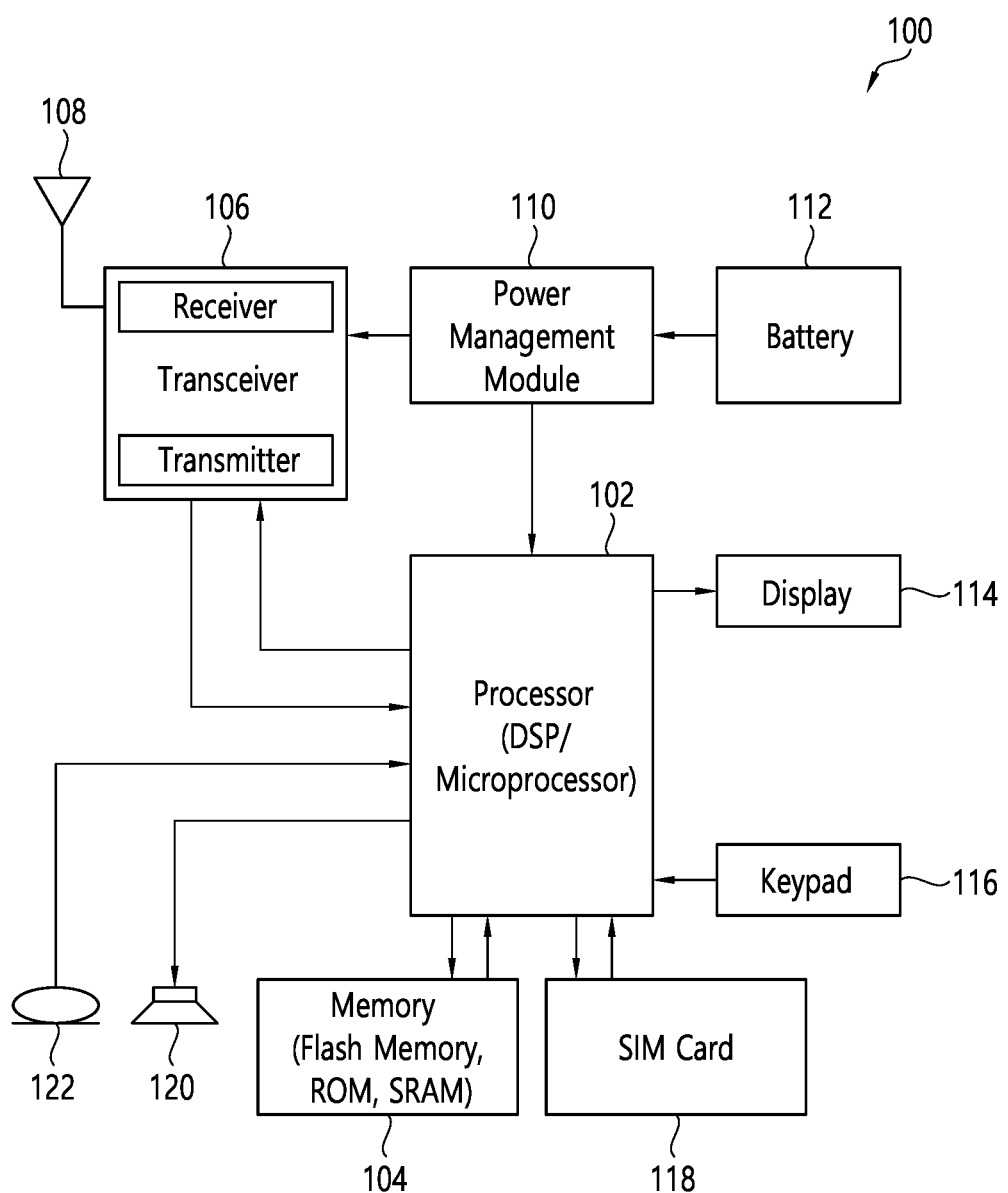
FIG. 4 shows an example of UE to which implementations of the present disclosure are applied.

FIG. 4 shows an example of UE to which implementations of the present disclosure are applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
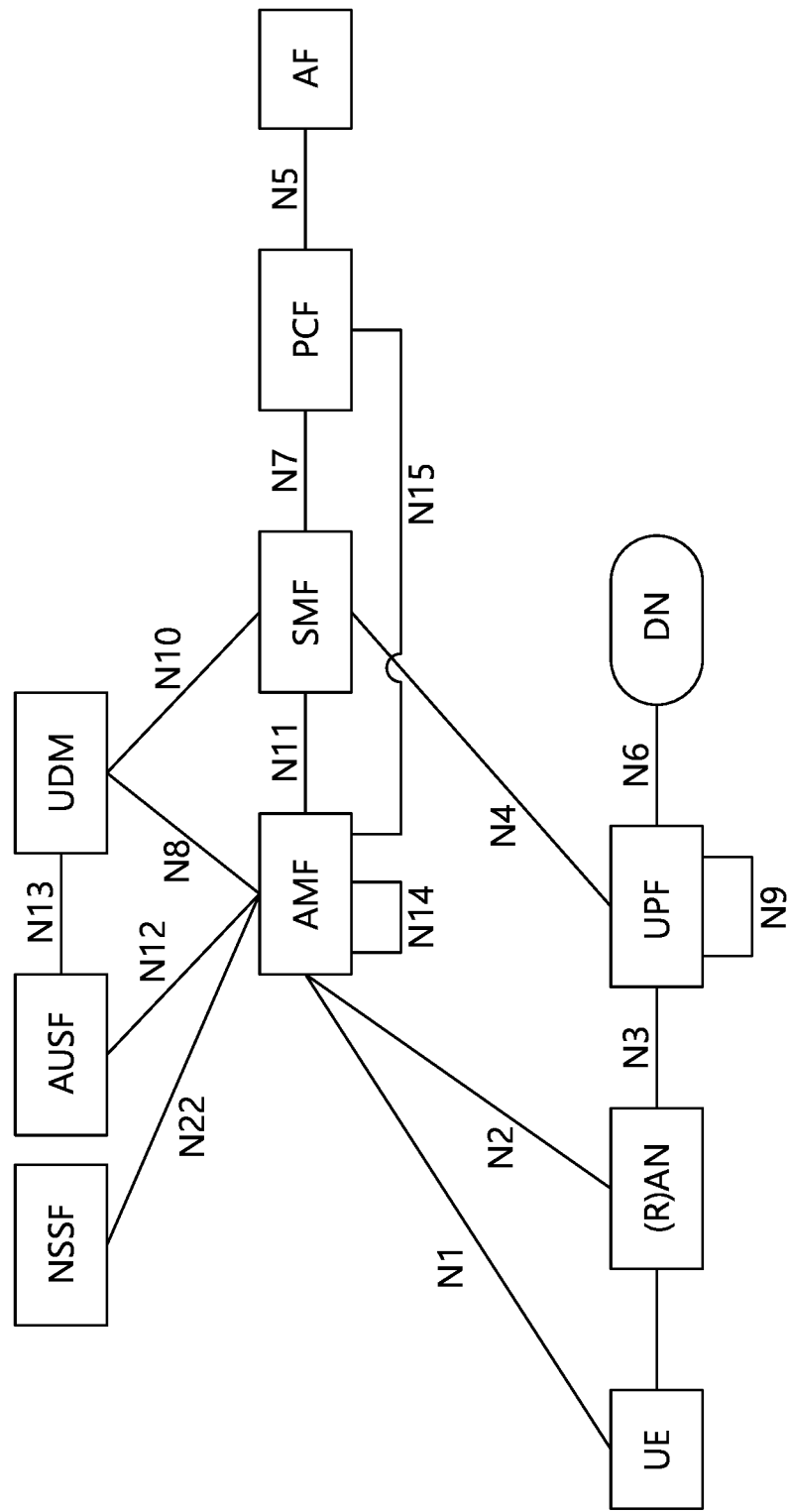
FIG. 5 shows an example of 5G system architecture to which implementations of the present disclosure are applied.

FIG. 5 shows an example of 5G system architecture to which implementations of the present disclosure are applied.

The 5G system (5GS) architecture consists of the following network functions (NF).

Authentication Server Function (AUSF)
  Access and Mobility Management Function (AMF)
  Data Network (DN), e.g., operator services, Internet access or 3rd party services
  Unstructured Data Storage Function (UDSF)
  Network Exposure Function (NEF)
  Intermediate NEF (I-NEF)
  Network Repository Function (NRF)
  Network Slice Selection Function (NSSF)
  Policy Control Function (PCF)
  Session Management Function (SMF)
  Unified Data Management (UDM)
  Unified Data Repository (UDR)
  User Plane Function (UPF)
  UE radio Capability Management Function (UCMF)
  Application Function (AF)
  User Equipment (UE)
  (Radio) Access Network ((R)AN)
  5G-Equipment Identity Register (5G-EIR)
  Network Data Analytics Function (NWDAF)
  CHarging Function (CHF)

Furthermore, the following network functions may be considered.

Non-3GPP InterWorking Function (N3IWF)
  Trusted Non-3GPP Gateway Function (TNGF)
  Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:

N1: Reference point between the UE and the AMF.
  N2: Reference point between the (R)AN and the AMF.
  N3: Reference point between the (R)AN and the UPF.
  N4: Reference point between the SMF and the UPF.
  N6: Reference point between the UPF and a Data Network.
  N9: Reference point between two UPFs.

The following reference points show the interactions that exist between the NF services in the NFs.

N5: Reference point between the PCF and an AF.
  N7: Reference point between the SMF and the PCF.
  N8: Reference point between the UDM and the AMF.
  N10: Reference point between the UDM and the SMF.
  N11: Reference point between the AMF and the SMF.
  N12: Reference point between the AMF and the AUSF.
  N13: Reference point between the UDM and the AUSF.
  N14: Reference point between two AMFs.

N15: Reference point between the PCF and the AMF in the case of non-roaming scenario, PCF in the visited network and AMF in the case of roaming scenario.

N16: Reference point between two SMFs, (in roaming case between SMF in the visited network and the SMF in the home network).

N22: Reference point between the AMF and the NSSF.

In some cases, a couple of NFs may need to be associated with each other to serve a UE.

A registration procedure is described. Section 4.2.2.2 of 3GPP TS 23.502 V16.3.0 (2019-12) can be referred.

Figure 6:
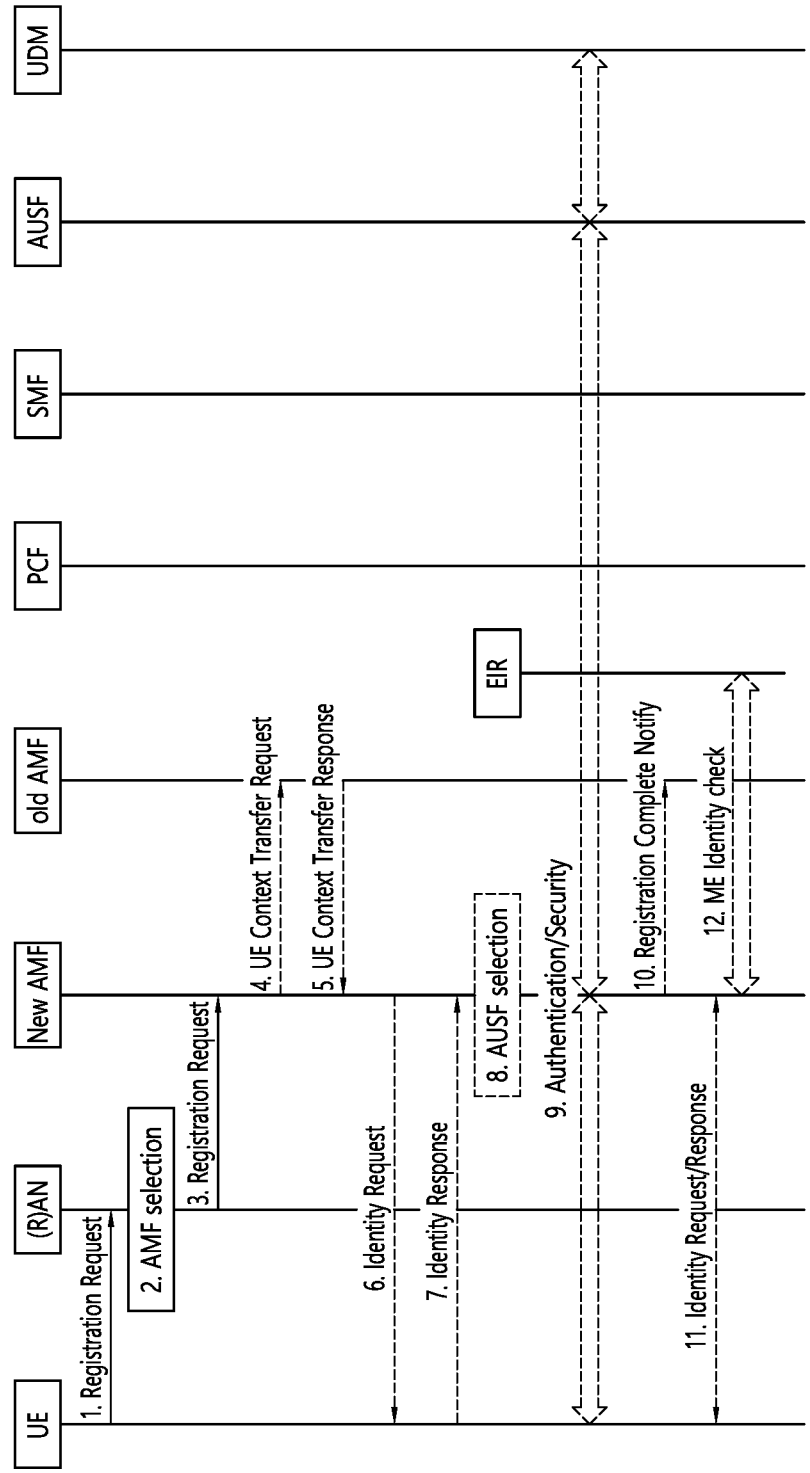
FIGS. 6 and 7 show an example of a registration procedure to which implementations of the present disclosure are applied.
Figure 7:
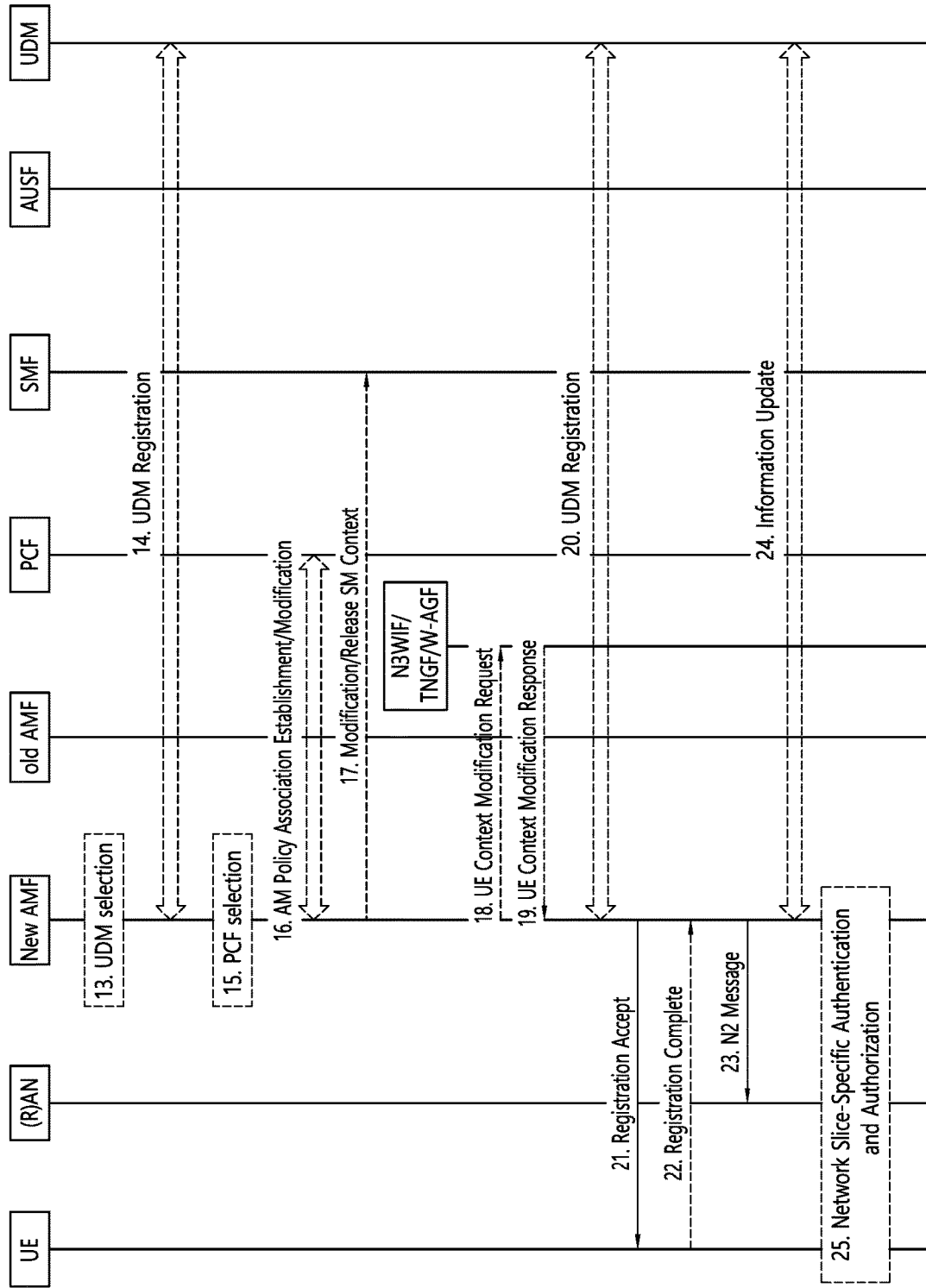

FIGS. 6 and 7 show an example of a registration procedure to which implementations of the present disclosure are applied.

A UE needs to register with the network to get authorized to receive services, to enable mobility tracking and to enable reachability. The UE initiates the registration procedure using one of the following registration types:

Initial registration to the 5GS; or
Mobility registration update; or
Periodic registration update; or
Emergency registration.

The general registration procedure in FIGS. 6 and 7 applies on all these registration procedures, but the periodic registration update need not include all parameters that are used in other registration cases.

The general registration procedure in FIGS. 6 and 7 is also used for the case of registration in 3GPP access when the UE is already registered in a non-3GPP access, and vice versa. Registration in 3GPP access when the UE is already registered in a non-3GPP access scenario may require an AMF change.

First, procedures of FIG. 6 are described.

(1) Step 1: The UE transmits a Registration Request message to the (R)AN. The Registration Request message corresponds to AN message.

The Registration Request message may include AN parameters. In the case of NG-RAN, the AN parameters include, e.g., 5G SAE temporary mobile subscriber identity (5G-S-TMSI) or globally unique AMF ID (GUAMI), the selected public land mobile network (PLMN) ID (or PLMN ID and network identifier (NID)) and Requested network slice selection assistance information (NSSAI). The AN parameters also include establishment cause. The establishment cause provides the reason for requesting the establishment of an RRC connection. Whether and how the UE includes the Requested NSSAI as part of the AN parameters is dependent on the value of the access stratum connection establishment NSSAI inclusion mode parameter.

The Registration Request message may include a registration type. The registration type indicates if the UE wants to perform an initial registration (i.e., the UE is in RM-DEREGISTERED state), a mobility registration update (i.e., the UE is in RM-REGISTERED state and initiates a registration procedure due to mobility or due to the UE needs to update its capabilities or protocol parameters, or to request a change of the set of network slices it is allowed to use), a periodic registration update (i.e., the UE is in RM-REGISTERED state and initiates a registration procedure due to the periodic registration update timer expiry) or an emergency registration (i.e., the UE is in limited service state).

When the UE is performing an initial registration, the UE shall indicate its UE identity in the Registration Request message as follows, listed in decreasing order of preference:

i) a 5G globally unique temporary identifier (5G-GUTI) mapped from an evolved packet system (EPS) GUTI, if the UE has a valid EPS GUTI.

ii) a native 5G-GUTI assigned by the PLMN to which the UE is attempting to register, if available;

iii) a native 5G-GUTI assigned by an equivalent PLMN to the PLMN to which the UE is attempting to register, if available;

iv) a native 5G-GUTI assigned by any other PLMN, if available.

v) Otherwise, the UE shall include its subscriber concealed identifier (SUCI) in the Registration Request message.

When the UE performing an initial registration has both a valid EPS GUTI and a native 5G-GUTI, the UE shall also indicate the native 5G-GUTI as additional GUTI. If more than one native 5G-GUTIs are available, the UE shall select the 5G-GUTI in decreasing order of preference among items (ii)-(iv) in the list above.

When the UE is performing an initial registration with a native 5G-GUTI, then the UE shall indicate the related GUAMI information in the AN parameters. When the UE is performing an initial registration with its SUCI, the UE shall not indicate any GUAMI information in the AN parameters.

For an emergency registration, the SUCI shall be included if the UE does not have a valid 5G-GUTI available; the permanent equipment identifier (PEI) shall be included when the UE has no subscriber permanent identifier (SUPI) and no valid 5G-GUTI. In other cases, the 5G-GUTI is included and it indicates the last serving AMF.

The Registration Request message may also include security parameters, PDU Session Status, etc. The security parameters are used for authentication and integrity protection. The PDU Session Status indicates the previously established PDU sessions in the UE. When the UE is connected to the two AMFs belonging to different PLMN via 3GPP access and non-3GPP access then the PDU Session status indicates the established PDU Session of the current PLMN in the UE.

(2) Step 2: The (R)AN selects an AMF.

If a 5G-S-TMSI or GUAMI is not included or the 5G-S-TMSI or GUAMI does not indicate a valid AMF, the (R)AN, based on (R)AT and requested NSSAI, if available, selects an AMF.

If UE is in CM-CONNECTED state, the (R)AN can forward the Registration Request message to the AMF based on the N2 connection of the UE.

If the (R)AN cannot select an appropriate AMF, it forwards the Registration Request message to an AMF which has been configured, in the (R)AN, to perform AMF selection.

(3) Step 3: The (R)AN transmits a Registration Request message to the new AMF. The Registration Request message corresponds to N2 message.

The Registration Request message may include whole information and/or a part of information included in the Registration Request message received from the UE which is described in step 1.

The Registration Request message may include N2 parameters. When NG-RAN is used, the N2 parameters include the selected PLMN ID (or PLMN ID and NID), location information and cell identity related to the cell in which the UE is camping, UE context request which indicates that a UE context including security information needs to be setup at the NG-RAN. When NG-RAN is used, the N2 parameters shall also include the establishment cause.

If the Registration type indicated by the UE is Periodic Registration Update, then steps 4 to 19 may be omitted.

(4) Step 4: If the UE's 5G-GUTI was included in the Registration Request message and the serving AMF has changed since last registration procedure, the new AMF may invoke the Namf_Communication_UEContextTransfer service operation on the old AMF including the complete registration request non-access stratum (NAS) message to request the UE's SUPI and UE context.

(5) Step 5: The Old AMF may respond to the new AMF for the Namf_Communication_UEContextTransfer invocation by including the UE's SUPI and UE context.

(6) Step 6: If the SUCI is not provided by the UE nor retrieved from the old AMF, the identity request procedure may be initiated by the new AMF sending the Identity Request message to the UE requesting the SUCI.

(7) Step 7: The UE may respond with an Identity Response message including the SUCI. The UE derives the SUCI by using the provisioned public key of the home PLMN (HPLMN).

(8) Step 8: The new AMF may decide to initiate UE authentication by invoking an AUSF. In that case, the new AMF selects an AUSF based on SUPI or SUCI.

(9) Step 9: Authentication/security may be established by the UE, new AMF, AUSF and/or UDM.

(10) Step 10: If the AMF has changed, the new AMF may notify the old AMF that the registration of the UE in the new AMF is completed by invoking the Namf_Communication_RegistrationCompleteNotify service operation. If the authentication/security procedure fails, then the registration shall be rejected, and the new AMF may invoke the Namf_Communication_RegistrationCompleteNotify service operation with a reject indication reason code towards the old AMF. The old AMF may continue as if the UE context transfer service operation was never received.

(11) Step 11: If the PEI was not provided by the UE nor retrieved from the old AMF, the Identity Request procedure may be initiated by the new AMF sending an Identity Request message to the UE to retrieve the PEI. The PEI shall be transferred encrypted unless the UE performs emergency registration and cannot be authenticated.

(12) Step 12: Optionally, the new AMF may initiate ME identity check by invoking the N5g-eir_EquipmentIdentityCheck_Get service operation.

Now, procedures of FIG. 7, which follow the procedures of FIG. 6, are described.

(13) Step 13: If step 14 below is to be performed, the new AMF, based on the SUPI, may select a UDM, then UDM may select a UDR instance.

(14) Step 14: The new AMF may register with the UDM.

(15) Step 15: The new AMF may select a PCF.

(16) Step 16: The new AMF may optionally perform an AM Policy Association Establishment/Modification.

(17) Step 17: The new AMF may transmit Update/Release SM Context message (e.g., Nsmf_PDUSession_UpdateSMContext and/or Nsmf_PDUSession_ReleaseSMContext) to the SMF.

(18) Step 18: If the new AMF and the old AMF are in the same PLMN, the new AMF may send a UE Context Modification Request to the N3IWF/TNGF/W-AGF.

(19) Step 19: The N3IWF/TNGF/W-AGF may send a UE Context Modification Response to the new AMF.

(20) Step 20: After the new AMF receives the response message from the N3IWF/TNGF/W-AGF in step 19, the new AMF may register with the UDM.

(21) Step 21: The new AMF transmits a Registration Accept message to the UE.

The new AMF sends a Registration Accept message to the UE indicating that the Registration Request has been accepted. 5G-GUTI is included if the new AMF allocates a new 5G-GUTI. If the UE is already in RM-REGISTERED state via another access in the same PLMN, the UE shall use the 5G-GUTI received in the Registration Accept message for both registrations. If no 5G-GUTI is included in the Registration Accept message, then the UE uses the 5G-GUTI assigned for the existing registration also for the new registration. If the new AMF allocates a new registration area, it shall send the registration area to the UE via Registration Accept message. If there is no registration area included in the Registration Accept message, the UE shall consider the old registration area as valid. Mobility Restrictions is included in case mobility restrictions applies for the UE and registration type is not emergency registration. The new AMF indicates the established PDU sessions to the UE in the PDU Session status. The UE removes locally any internal resources related to PDU sessions that are not marked as established in the received PDU Session status. When the UE is connected to the two AMFs belonging to different PLMN via 3GPP access and non-3GPP access then the UE removes locally any internal resources related to the PDU session of the current PLMN that are not marked as established in received PDU Session status. If the PDU Session status information was in the Registration Request message, the new AMF shall indicate the PDU Session status to the UE.

The Allowed NSSAI provided in the Registration Accept message is valid in the registration area and it applies for all the PLMNs which have their tracking areas included in the registration area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the serving PLMN to the HPLMN S-NSSAIs.

Furthermore, optionally the new AMF performs a UE Policy Association Establishment.

(22) Step 22: The UE may send a Registration Complete message to the new AMF when it has successfully updated itself.

The UE may send a Registration Complete message to the new AMF to acknowledge if a new 5G-GUTI was assigned.

(23) Step 23: For registration over 3GPP Access, if the new AMF does not release the signaling connection, the new AMF may send the RRC Inactive Assistance Information to the NG-RAN. For registration over non-3GPP Access, if the UE is also in CM-CONNECTED state on 3GPP access, the new AMF may send the RRC Inactive Assistance Information to the NG-RAN.

(24) Step 24: The new AMF may perform information update towards the UDM.

(25) Step 25: The UE may execute Network Slice-Specific Authentication and Authorization (NSSAA) procedure.

Initial registration not accepted by the network is described. Section 5.5.1.2.5 of 3GPP TS 24.501 V16.4.1 can be referred.

When the network slice requested by the UE is not available, the network informs that a specific network slice is unavailable through a rejected NSSAI. When the network informs that a specific slice is unavailable, the UE performs the registration procedure again in the current cell if a network slice other than the specific network slice is available, and selects another PLMN if all network slices are unavailable.

More specifically, if the initial registration request cannot be accepted by the network, the AMF shall send a REGISTRATION REJECT message to the UE including an appropriate 5GMM cause value.

If the initial registration request is rejected for the following reason, the network shall set the 5GMM cause value to #62 "No network slices available" and may include the rejected NSSAI.

a) all the S-NSSAI(s) included in the requested NSSAI are either rejected for the current PLMN, rejected for the current registration area, or rejected due to the failed or revoked NSSAA, or the UE did not request any S-NSSAIs; and b-1) the UE set the NSSAA bit in the 5GMM capability information element (IE) to "Network slice-specific authentication and authorization supported" and there are no subscribed S-NSSAIs marked as default; or b-2) the UE set the NSSAA bit in the 5GMM capability information element (IE) to "Network slice-specific authentication and authorization not supported", and i) there are no subscribed S-NSSAIs which are marked as default, ii) all subscribed S-NSSAIs marked as default are subject to NSSAA;

The UE performs the following operation according to the 5GMM cause value set to #62.

The UE shall abort the initial registration procedure, set the 5GS update status to "5U2 NOT UPDATED" and enter state "5GMM-DEREGISTERED.NORMAL-SERVICE" or "5GMM-DEREGISTERED.PLMN-SEARCH". Additionally, the UE shall reset the registration attempt counter.

The UE receiving the rejected NSSAI in the REGISTRATION REJECT message takes the following actions based on the rejection cause in the rejected S-NSSAI(s).

"S-NSSAI not available in the current PLMN or SNPN": The UE shall store the rejected S-NSSAI(s) in the rejected NSSAI for the current PLMN or SNPN and not attempt to use this S-NSSAI(s) in the current PLMN or SNPN until switching off the UE, the universal integrated circuit card (UICC) containing the universal subscriber identification module (USIM) is removed, an entry of the "list of subscriber data" with the SNPN identity of the current SNPN is updated, or the rejected S-NSSAI(s) are removed.

"S-NSSAI not available in the current registration area": The UE shall store the rejected S-NSSAI(s) in the rejected NSSAI for the current registration area and not attempt to use this S-NSSAI(s) in the current registration area until switching off the UE, the UE leaves the current registration area, the UICC containing the USIM is removed, an entry of the "list of subscriber data" with the SNPN identity of the current SNPN is updated, or the rejected S-NSSAI(s) are removed.

"S-NSSAI not available due to the failed or revoked network slice-specific authentication and authorization": The UE shall store the rejected S-NSSAI(s) in the rejected NSSAI due to the failed or revoked NSSAA and not attempt to use this S-NSSAI(s) in the current PLMN through all accesses until switching off the UE, the UICC containing the USIM is removed, an entry of the "list of subscriber data" with the SNPN identity of the current SNPN is updated, or the rejected S-NSSAI(s) are removed.

If the UE has an allowed NSSAI or configured NSSAI that contains S-NSSAI(s) which are not included any of the rejected NSSAI for the current PLMN or SNPN, the rejected NSSAI for the current registration area, and the rejected NSSAI due to the failed or revoked NSSAA, the UE may stay in the current serving cell, and apply the normal cell reselection process. In addition, the UE may start an initial registration with a requested NSSAI that includes any S-NSSAI from the allowed NSSAI or the configured NSSAI that is neither in the rejected NSSAI for the PLMN or SNPN nor in the rejected NSSAI for the current registration area. Otherwise, the UE may perform a PLMN selection or SNPN selection.

Network slicing is described. Section 4.6 of 3GPP TS 24.501 V16.4.1 can be referred.

The 5GS supports network slicing. Within a PLMN or Stand-alone Non-Public Network (SNPN), a network slice is identified by an S-NSSAI, which is comprised of a slice/service type (SST) and a slice differentiator (SD). Inclusion of an SD in an S-NSSAI is optional. A set of one or more S-NSSAIs is called the NSSAI. The following NSSAIs may be defined.

a) Configured NSSAI;
b) Requested NSSAI;
c) Allowed NSSAI;
d) Subscribed S-NSSAIs; and
e) Pending NSSAI.

The following NSSAIs may also be defined.

a) rejected NSSAI for the current PLMN or SNPN;
b) rejected NSSAI for the current registration area; and
c) rejected NSSAI for the failed or revoked NSSAA.

In case of a PLMN, a serving PLMN may configure a UE with the configured NSSAI per PLMN. In addition, the HPLMN may configure a UE with a single default configured NSSAI and consider the default configured NSSAI as valid in a PLMN for which the UE has neither a configured NSSAI nor an allowed NSSAI. In case of an SNPN, the SNPN may configure a UE with a configured NSSAI applicable to the SNPN.

The allowed NSSAI and rejected NSSAI for the current registration area are managed per access type independently, i.e., 3GPP access or non-3GPP access, and is applicable for the registration area. If the registration area contains tracking area IDs (TAIs) belonging to different PLMNs, which are equivalent PLMNs, the allowed NSSAI and the rejected NSSAI for the current registration area are applicable to these PLMNs in this registration area.

The allowed NSSAI that is associated with a registration area containing TAIs belonging to different PLMNs, which are equivalent PLMNs, can be used to form the requested NSSAI for any of the equivalent PLMNs when the UE is outside of the registration area where the allowed NSSAI was received.

When the NSSAA procedure is to be initiated for one or more S-NSSAIs in the requested NSSAI, these S-NSSAI(s) may be included in the pending NSSAI. When the NSSAA procedure is completed for an S-NSSAI that has been in the pending NSSAI, the S-NSSAI may be moved to the allowed NSSAI or rejected NSSAI depending on the outcome of the NSSAA procedure and communicated to the UE. The pending NSSAI is managed regardless of access type, i.e., the pending NSSAI is applicable to both 3GPP access and non-3GPP access even if sent over only one of the accesses.

The rejected NSSAI for the current PLMN or SNPN is applicable for the whole registered PLMN or SNPN. The AMF shall only send a rejected NSSAI for the current PLMN when the registration area consists of TAIs that only belong to the registered PLMN. If the UE receives a rejected NSSAI for the current PLMN, and the registration area also contains TAIs belonging to different PLMNs, the UE shall treat the received rejected NSSAI for the current PLMN as applicable to the whole registered PLMN.

The rejected NSSAI for the failed or revoked NSSAA includes one or more S-NSSAIs for which the NSSAA have been failed or revoked, and are applicable for the whole registered PLMN or SNPN.

NSSAI storage is described. Section 4.6.2.2 of 3GPP TS 24.501 V16.4.1 can be referred.

In general, the configured NSSAI is the subscription NSSAI of the UE when the UE accesses the HPLMN, and continues to be the same as long as the subscriber information of the UE does not change. However, an existing S-NSSAI may be created as a configured NSSAI due to a change in subscriber information, etc., or a specific S-NSSAI may be removed. Thereafter, the AMF may inform the UE of the updated S-NSSAI to the current access network.

In addition, the UE may store and store the NSSAI configured for the network visited by the UE in the non-volatile memory. Therefore, when the UE selects a new VPLMN, there may be NSSAI information configured in the previously visited network. Therefore, when performing PLMN selection, the UE may have the configured NSSAI information of the PLMN selected by the UE.

In addition, if there is a service level agreement (SLA) between the HPLMN and the VPLMN to which the UE can access, the UE can know of which HPLMN the VPLMN has the S-NSSAI.

If available, the configured NSSAI(s) shall be stored in a non-volatile memory in the UE. The allowed NSSAI(s) should be stored in a non-volatile memory in the UE.

Each of the configured NSSAI stored in the UE is a set composed of at most 16 S-NSSAIs. Each of the allowed NSSAI stored in the UE is a set composed of at most 8 S-NSSAIs and is associated with a PLMN ID or SNPN ID and an access type. Each of the configured NSSAI except the default configured NSSAI, and the rejected NSSAI is associated with a PLMN ID or SNPN ID. The S-NSSAI(s) in the rejected NSSAI for the current registration area are further associated with a registration area where the rejected S-NSSAI(s) is not available. The S-NSSAI(s) in the rejected NSSAI for the current PLMN or SNPN shall be considered rejected for the current PLMN or SNPN regardless of the access type. The S-NSSAI(s) in the rejected NSSAI for the failed or revoked NSSAA shall be considered rejected for the current PLMN regardless of the access type. There shall be no duplicated PLMN IDs or SNPN IDs in each of the list of configured NSSAI(s), allowed NSSAI(s), rejected NSSAI(s) for the current PLMN or SNPN, and rejected NSSAI(s) for the current registration area.

The UE stores NSSAIs as follows.

a) The configured NSSAI shall be stored until a new configured NSSAI is received for a given PLMN or SNPN. The network may provide to the UE the mapped S-NSSAI(s) for the new configured NSSAI which shall also be stored in the UE. When the UE is provisioned with a new configured NSSAI for a PLMN or SNPN, the UE shall perform the followings.

1) replace any stored configured NSSAI for this PLMN or SNPN with the new configured NSSAI for this PLMN or SNPN;

2) delete any stored mapped S-NSSAI(s) for the configured NSSAI and, if available, store the mapped S-NSSAI(s) for the new configured NSSAI;

3) delete any stored allowed NSSAI for this PLMN or SNPN and, if available, the stored mapped S-NSSAI(s) for the allowed NSSAI, if the UE received the new configured NSSAI for this PLMN or SNPN and the Configuration update indication IE with the Registration requested bit set to "registration requested", in the same CONFIGURATION UPDATE COMMAND message but without any new allowed NSSAI for this PLMN or SNPN included; and 4) delete any stored rejected NSSAI for the current PLMN or SNPN, rejected NSSAI for the current registration area and rejected NSSAI for the failed or revoked NSSAA.

If the UE receives an S-NSSAI associated with a PLMN ID from the network during the PDN connection establishment procedure in EPS, the UE may store the received S-NSSAI in the configured NSSAI for the PLMN identified by the PLMN ID associated with the S-NSSAI (if not already in the configured NSSAI).

The UE may continue storing a received configured NSSAI for a PLMN and associated mapped S-NSSAI(s), if available, when the UE registers in another PLMN.

b) The allowed NSSAI shall be stored until a new allowed NSSAI is received for a given PLMN or SNPN. The network may provide to the UE the mapped S-NSSAI(s) for the new allowed NSSAI which shall also be stored in the UE. When a new allowed NSSAI for a PLMN or SNPN is received, the UE shall perform the followings.

1) replace any stored allowed NSSAI for this PLMN or SNPN with the new allowed NSSAI for this PLMN or SNPN;

2) delete any stored mapped S-NSSAI(s) for the allowed NSSAI and, if available, store the mapped S-NSSAI(s) for the new allowed NSSAI;

3) remove from the stored rejected NSSAI, the S-NSSAI(s), if any, included in the new allowed NSSAI for the current PLMN or SNPN; and 4) remove from the stored pending NSSAI, one or more S-NSSAIs, if any, included in the new allowed NSSAI for the current PLMN or SNPN.

If the UE receives the CONFIGURATION UPDATE COMMAND message with the Registration requested bit of the Configuration update indication IE set to "registration requested" and contains no other parameters, the UE shall delete any stored allowed NSSAI for this PLMN or SNPN, and delete any stored mapped S-NSSAI(s) for the allowed NSSAI, if available.

c) When the UE receives the S-NSSAI(s) included in rejected NSSAI in the REGISTRATION ACCEPT message, the REGISTRATION REJECT message, the DEREGISTRATION REQUEST message or in the CONFIGURATION UPDATE COMMAND message, the UE shall perform the followings.

1) store the S-NSSAI(s) into the rejected NSSAI based on the associated rejection cause(s);

2) remove from the stored allowed NSSAI for the current PLMN or SNPN, the S-NSSAI(s), if any, included in the:

i) rejected NSSAI for the current PLMN or SNPN, for each and every access type;

ii) rejected NSSAI for the current registration area, associated with the same access type; and iii) rejected NSSAI due to the failed or revoked NSSAA, for each and every access type;

3) remove from the stored pending NSSAI for the current PLMN or SNPN, one or more S-NSSAIs, if any, included in the:

i) rejected NSSAI for the current PLMN or SNPN, for each and every access type;

ii) rejected NSSAI for the current registration area, associated with the same access type; and iii) rejected NSSAI for the failed or revoked NSSAA, for each and every access type.

When the UE:

1) deregisters with the current PLMN using explicit signalling or enters state 5GMM-DEREGISTERED for the current PLMN; or 2) successfully registers with a new PLMN; or 3) enters state 5GMM-DEREGISTERED following an unsuccessful registration with a new PLMN;

and the UE is not registered with the current PLMN over another access, the rejected NSSAI for the current PLMN shall be deleted.

When the UE:

1) deregisters over an access type;
2) successfully registers in a new registration area over an access type; or
3) enters state 5GMM-DEREGISTERED or 5GMM-REGISTERED following an unsuccessful registration in a new registration area over an access type;

the rejected NSSAI for the current registration area corresponding to the access type shall be deleted.

d) When the UE receives one or more S-NSSAIs included in pending NSSAI in the REGISTRATION ACCEPT message, the UE shall store one or more S-NSSAIs for the pending NSSAI.

When the UE:

1) deregisters with the current PLMN using explicit signalling or enters state 5GMM-DEREGISTERED for the current PLMN;
2) successfully registers with a new PLMN;
3) enters state 5GMM-DEREGISTERED following an unsuccessful registration with a new PLMN;
4) successfully completes an attach or tracking area update procedure in S1 mode; or
5) initiates attach or tracking area update procedure in S1 mode and receives an ATTACH REJECT or TRACKING AREA UPDATE REJECT;

and the UE is not registered with the current PLMN over another access, the pending NSSAI for the current PLMN shall be deleted.

e) In case of a PLMN, when the UE receives the Network slicing indication IE with the Network slicing subscription change indication set to "Network slicing subscription changed" in the REGISTRATION ACCEPT message or in the CONFIGURATION UPDATE COMMAND message, the UE shall delete the network slicing information for each of the PLMNs that the UE has slicing information stored for (excluding the current PLMN). The UE shall not delete the default configured NSSAI. Additionally, the UE shall update the network slicing information for the current PLMN (if received) as specified above in bullets a), b), c) and e).

NSSAA is described. Section 4.2.9 of 3GPP TS 23.502 V16.4.0 can be referred.

The NSSAA procedure is triggered for an S-NSSAI requiring Network Slice-Specific Authentication and Authorization with an AAA server (AAA-S) which may be hosted by the H-PLMN operator or by a third party which has a business relationship with the H-PLMN, using the EAP framework. An AAA proxy (AAA-P) in the HPLMN may be involved, e.g., if the AAA Server belongs to a third party.

This procedure is triggered by the AMF during a Registration procedure (e.g., Step 25 of FIG. 7) when some Network Slices require Slice-Specific Authentication and Authorization, when AMF determines that Network Slice-Specific Authentication and Authorization is required for an S-NSSAI in the current Allowed NSSAI (e.g., subscription change), or when the AAA server that authenticated the Network Slice triggers a re-authentication.

The AMF performs the role of the EAP authenticator and communicates with the AAA-S via the AUSF. The AUSF undertakes any AAA protocol interworking with the AAA protocol supported by the AAA-S.

Figure 8:
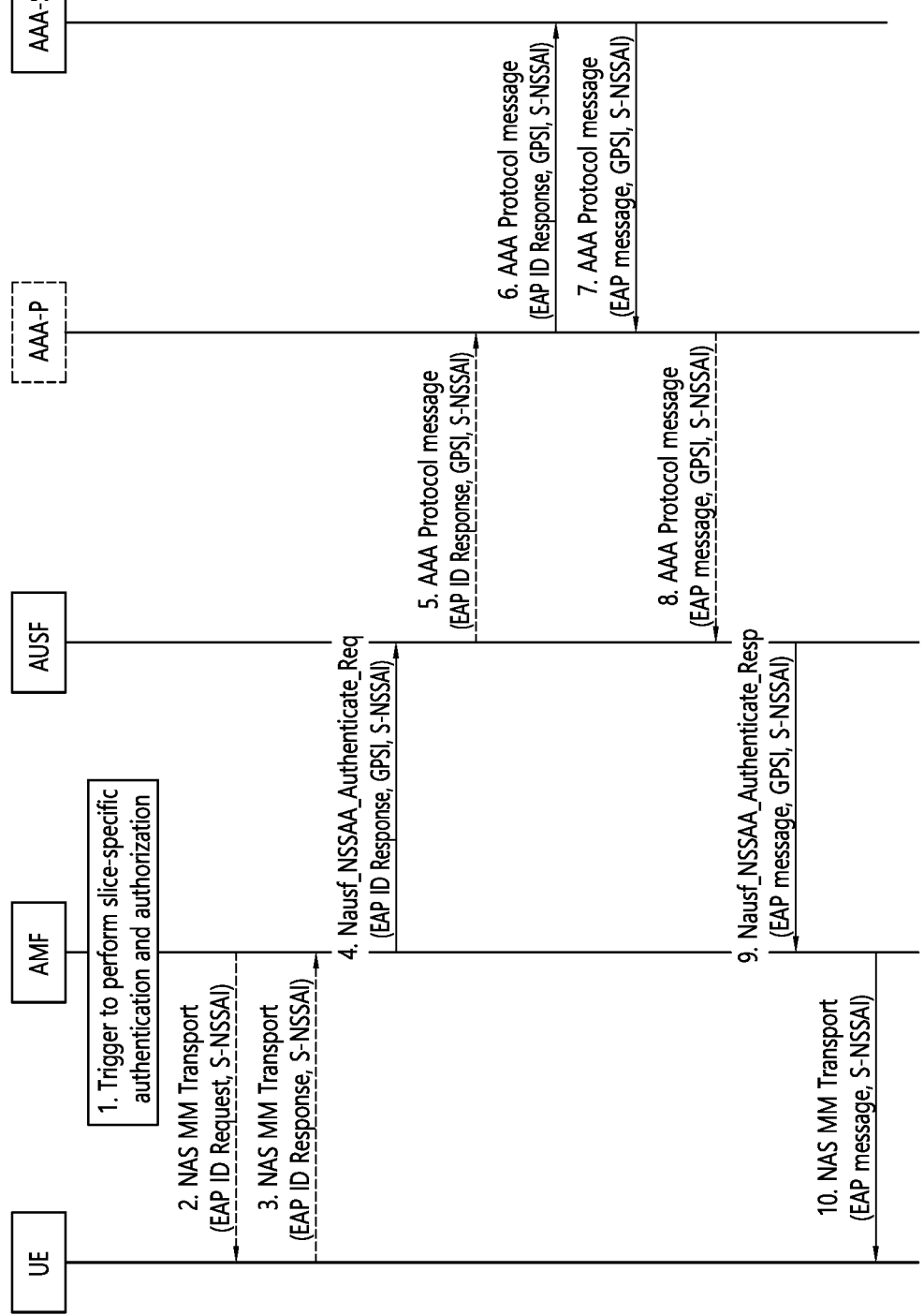
FIGS. 8 and 9 show an example of an NSSAA procedure to which implementation of the present disclosure are applied.
Figure 9:
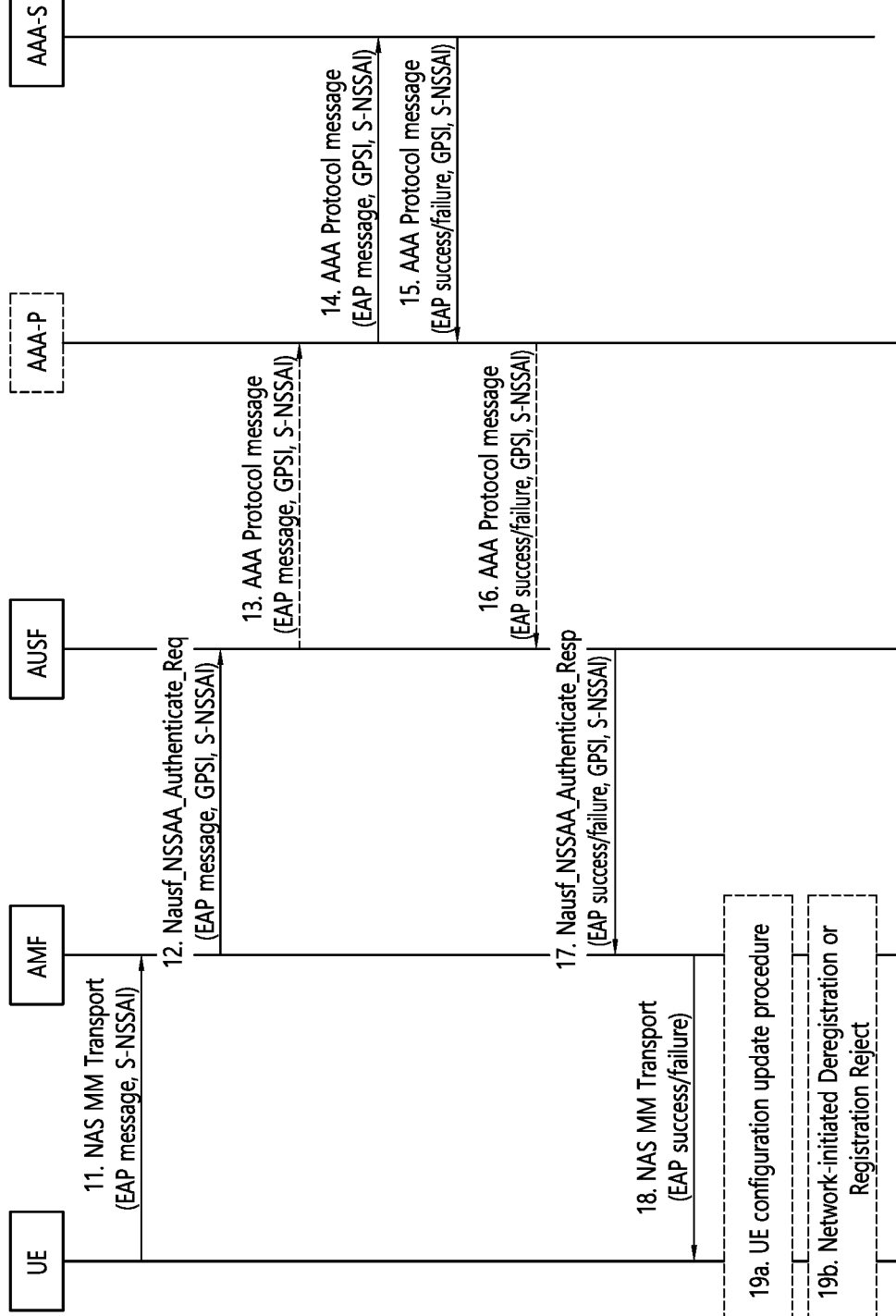

FIGS. 8 and 9 show an example of an NSSAA procedure to which implementations of the present disclosure are applied.

The AMF determines whether to perform the NSSAA procedure, and when the AMF determines to perform the NSSAA procedure, the AMF delivers an EAP ID request to the UE. When the AMF receives the EAP ID response from the UE, the AMF delivers it to the AAA-S through NSSAA Function (NSSAAF). After exchanging multiple EAP requests/responses, EAP success or failure is delivered. At this time, the AMF stores the EAP result of the corresponding S-NSSAI, and delivers the Allowed NSSAI or the Rejected NSSAI to the UE through the UE configuration update procedure.

First, the procedure of FIG. 8 is described.

1. For S-NSSAIs that are requiring NSSAA, based on change of subscription information, or triggered by the AAA-S, the AMF may trigger the start of the NSSAA procedure.

If NSSAA procedure is triggered as a result of registration procedure, the AMF may determine, based on UE context in the AMF, that for some or all S-NSSAI(s) subject to NSSAA, the UE has already been authenticated following a registration procedure on a first access. Depending on NSSAA result (e.g., success/failure) from the previous registration, the AMF may decide, based on network policies, to skip NSSAA for these S-NSSAIs during the registration on a second access.

If the NSSAA procedure corresponds to a re-authentication and re-authorization procedure triggered as a result of AAA-S-triggered UE re-authentication and re-authorization for one or more S-NSSAIs, or triggered by the AMF based on operator policy or a subscription change and if S-NSSAIs that are requiring NSSAA are included in the Allowed NSSAI for each access type, the AMF selects an access type to be used to perform the NSSAA procedure based on network policies.

The AMF may send an EAP ID request for the S-NSSAI in a NAS MM transport message including the S-NSSAI. This is the S-NSSAI of the H-PLMN, not the locally mapped S-NSSAI value.

The UE provides the EAP ID response for the S-NSSAI alongside the S-NSSAI in an NAS MM transport message towards the AMF.

The AMF sends the EAP ID Response to the AUSF in a Nausf_NSSAA_Authenticate Request (EAP ID response, AAA-S address, Generic Public Subscription Identifier (GPSI), S-NSSAI).

If the AAA-P is present (e.g., because the AAA-S belongs to a third party and the operator deploys a proxy towards third parties), the AUSF forwards the EAP ID response message to the AAA-P. Otherwise, the AUSF forwards the message directly to the AAA-S. The AUSF uses towards the AAA-P or the AAA-S an AAA protocol message of the same protocol supported by the AAA-S.

6. The AAA-P forwards the EAP ID message to the AAA-S addressable by the AAA-S address together with S-NSSAI and GPSI. The AAA-S stores the GPSI to create an association with the EAP ID in the EAP ID response message, so the AAA-S can later use it to revoke authorization or to trigger reauthentication.

7-14. EAP-messages are exchanged with the UE. One or more than one iteration of these steps may occur.

Now, the procedure of FIG. 9 following the procedure of FIG. 8 will be described.

15. EAP authentication completes. The AAA-S stores the S-NSSAI for which the authorization has been granted, so it may decide to trigger reauthentication and reauthorization based on its local policies. An EAP-Success/Failure message is delivered to the AAA-P (or if the AAA-P is not present, directly to the AUSF) with GPSI and S-NSSAI.

16. If the AAA-P is used, the AAA-P sends an AAA Protocol message including EAP-Success/Failure, S-NSSAI, GPSI to the AUSF.

17. The AUSF sends the ausf_NSSAA_Authenticate Response including EAP-Success/Failure, S-NSSAI, GPSI to the AMF.

18. The AMF transmits a NAS MM transport message (EAP-Success/Failure) to the UE. The AMF shall store the EAP result for each S-NSSAI for which the NSSAA procedure in steps 1-17 was executed.

19a. [Conditional] If a new Allowed NSSAI (i.e., including any new S-NSSAIs in a Requested NSSAI for which the NSSAA procedure succeeded and/or excluding any S-NSSAI(s) in the existing Allowed NSSAI for the UE for which the procedure has failed) and/or new Rejected S-NSSAIs (i.e., including any S-NSSAI(s) in the existing Allowed NSSAI for the UE for which the procedure has failed, or any new requested S-NSSAI(s) for which the NSSAA procedure failed) need to be delivered to the UE, or if the AMF re-allocation is required, the AMF initiates the UE Configuration Update procedure, for each access type.

19b. [Conditional] If the NSSAA procedure fails for all S-NSSAIs (if any) in the existing Allowed NSSAI for the UE and (if any) for all S-NSSAIs in the Requested NSSAI, the AMF shall execute the network-initiated deregistration procedure, or reject the UE registration request (if that was the trigger for this procedure). The AMF shall include in the explicit de-registration request or registration reject message the list of Rejected S-NSSAIs, each of them with the appropriate rejection cause value. If the network slice-specific re-authentication and re-authorization fails and there are PDU session(s) established that are associated with the S-NSSAI for which the NSSAA procedure failed, the AMF shall initiate the PDU session release procedure to release the PDU sessions with the appropriate cause value.

Figure 10:
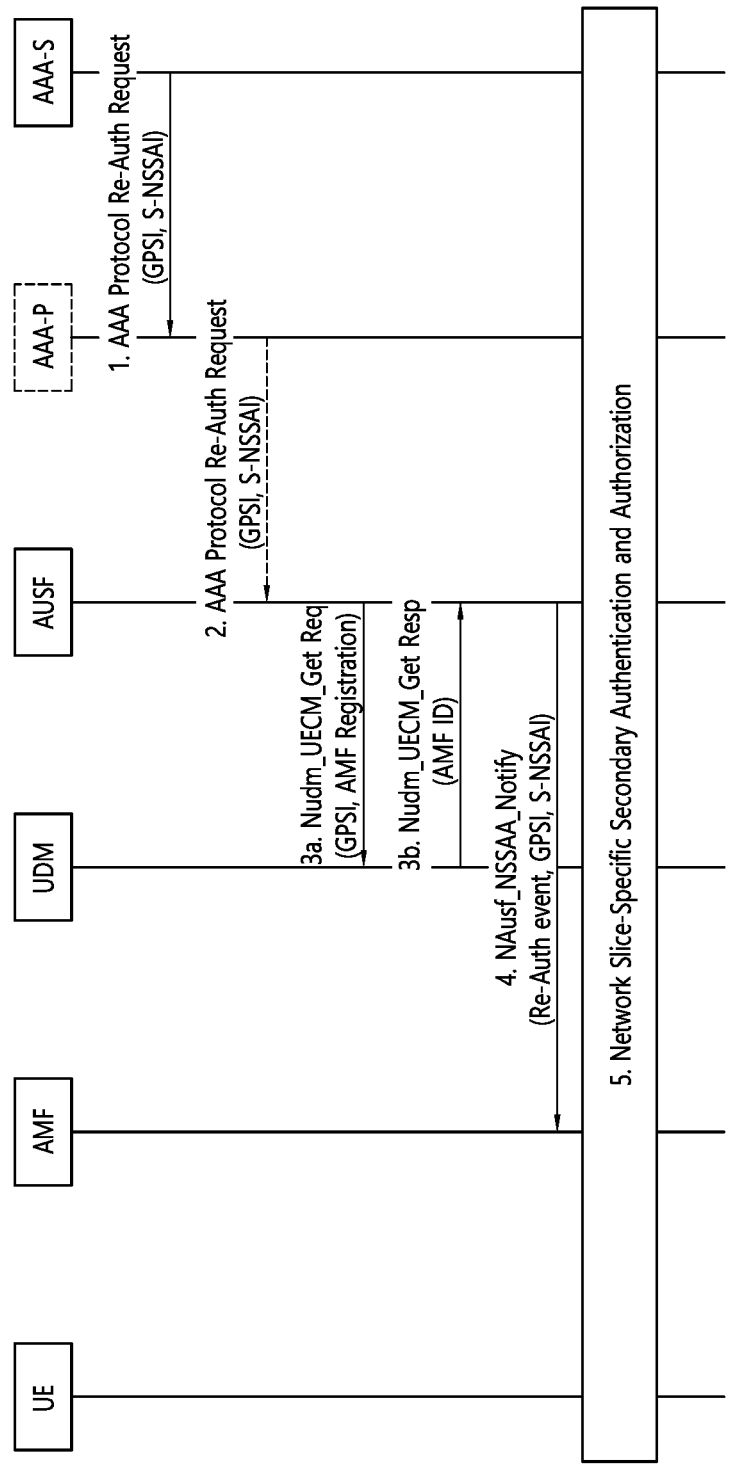
FIG. 10 shows an example of a network slice specific re-authentication and re-authorization procedure initiated by AAA-S to which implementations of the present disclosure are applied.

FIG. 10 shows an example of a network slice specific re-authentication and re-authorization procedure initiated by AAA-S to which implementations of the present disclosure are applied.

The AAA-S triggers re-authentication and re-authorization of NSSAA. Re-authentication and re-authorization are performed for network slices that have already been authenticated and authorized. When AAA-S informs the reauthentication event, GPSI, and S-NSSAI, the AMF performs NSSAA re-authentication and re-authorization.

1. The AAA-S requests the re-authentication and re-authorization for the network slice specified by the S-NSSAI in the AAA protocol re-authentication request message, for the UE identified by the GPSI in this message. This message is sent to a AAA-P, if the AAA-P is used (e.g., the AAA Server belongs to a third party), otherwise it is sent directly to the AUSF.

2. The AAA-P, if present, relays the request to the AUSF.

3a-3b. The AUSF gets AMF ID from UDM using Nudm_UECM_Get with the GPSI in the received AAA message.

4. The AUSF notifies re-authentication event to the AMF to re-authenticate/re-authorize the S-NSSAI for the UE using Nausf_NSSAA_Notify with the GPSI and S-NSSAI in the received AAA message.

5. The AMF triggers the NSSAA procedure defined in FIGS. 8 and 9.

Figure 11:
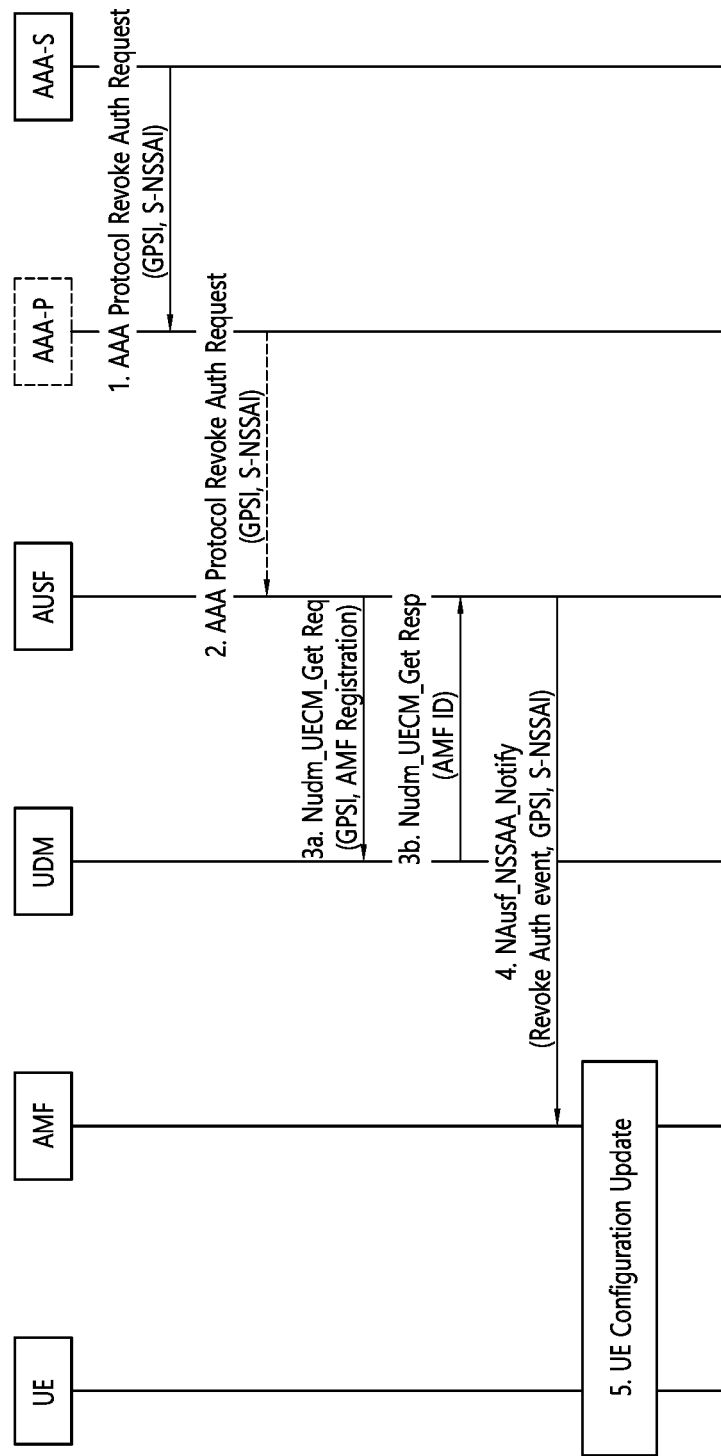
FIG. 11 shows an example of a network slice specific authorization revocation procedure initiated by AAA-S to which implementations of the present disclosure are applied.

FIG. 11 shows an example of a network slice specific authorization revocation procedure initiated by AAA-S to which implementations of the present disclosure are applied.

The AAA-S may cancel and/or revoke authentication and/or authorization for S-NSSAI for which authentication and authorization procedures have already been performed, when desired.

1. The AAA-S requests the revocation of authorization for the network slice specified by the S-NSSAI in the AAA protocol revoke authorization Request message, for the UE identified by the GPSI in this message. This message is sent to AAA-P if it is used.

2. The AAA-P, if present, relays the request to the AUSF.

3a-3b. AUSF gets AMF ID from UDM using Nudm_UECM_Get with the GPSI in the received AAA message.

4. The AUSF notifies revoke authorization event to the AMF to revoke the S-NSSAI authorization for the UE using Nausf_NSSAA_Notify with the GPSI and S-NSSAI in the received AAA message.

5. The AMF updates the UE configuration to revoke the S-NSSAI from the current Allowed NSSAI, for any access type for which NSSAA had been successfully run on this S-NSSAI. The UE configuration update may include a request to register if the AMF needs to be re-allocated. The AMF provides a new Allowed NSSAI to the UE by removing the S-NSSAI for which authorization has been revoked. The AMF provides new rejected NSSAIs to the UE including the S-NSSAI for which authorization has been revoked. If no S-NSSAI is left in Allowed NSSAI for an access after the revocation, and a default NSSAI exists that requires no network slice specific authentication or for which a network slice specific authentication did not previously fail over this access, then the AMF may provide a new Allowed NSSAI to the UE containing the default NSSAI. If no S-NSSAI is left in Allowed NSSAI for an access after the revocation, and no default NSSAI can be provided to the UE in the Allowed NSSAI or a previous network slice specific authentication failed for the default NSSAI over this access, then the AMF shall execute the network-initiated deregistration procedure for the access, and it shall include in the explicit de-registration request message the list of Rejected S-NSSAIs, each of them with the appropriate rejection cause value. If there are PDU session(s) established that are associated with the revoked S-NSSAI, the AMF shall initiate the PDU session release procedure to release the PDU sessions with the appropriate cause value.

Authentication is described. Section 5.2.2.2 of 3GPP TS 29.526 V1.0.0 can be referred.

The authenticate service operation permits the NF service consumer (i.e., the AMF) to initiate slice-specific authentication and authorization. The NSSAAF may relay the EAP message to an AAA-S and collect the result of slice-specific authentication and authorization from the AAA-S, as specified in FIGS. 8 and 9.

The NF service consumer (i.e., the AMF) shall send a POST request to the resource representing slice authentication collection (i.e., . . . /v1/slice-authentications) to request the NSSAAF to create the corresponding resource context and perform slice-specific authentication and authorization.

Figure 12:
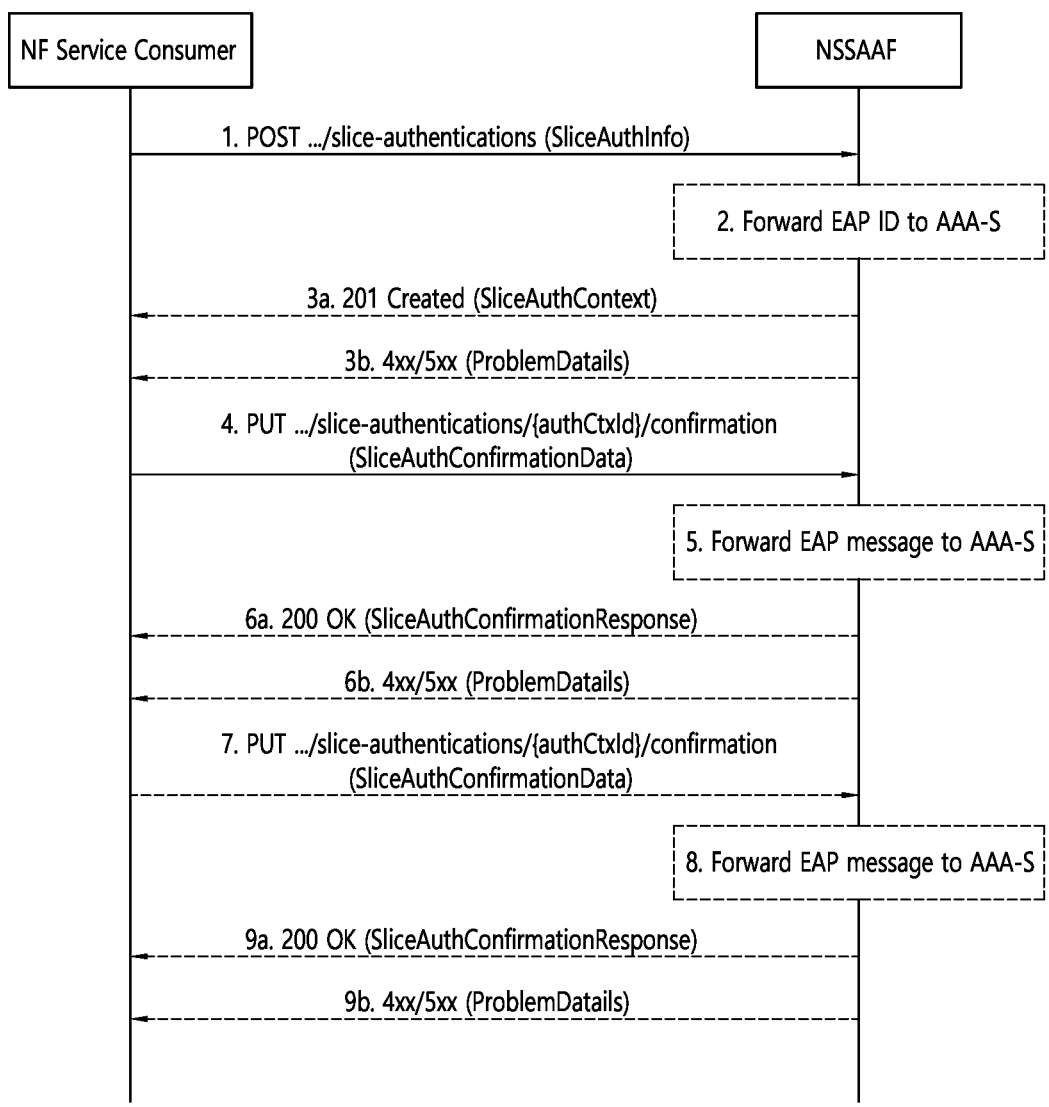
FIG. 12 shows an example of a slice specific authentication and authorization to which implementations of the present disclosure are applied.

FIG. 12 shows an example of a slice specific authentication and authorization to which implementations of the present disclosure are applied.

1. The NF service consumer (i.e., AMF) shall send a POST request to the NSSAAF, targeting the resource of slice authentication collection (i.e., . . . /v1/slice-authentications), to perform slice-specific authentication and authorization.

The payload of the body shall contain the slice authentication information, which includes:

UE ID (i.e., GPSI)
S-NSSAI
EAP ID Response message (which is received from the UE)
optionally, the AAA-S address
optionally, the callback Uniform Resource Identifier (URI) of the AMF to receive re-authentication notification from the NSSAAF;
optionally, the callback URI of the AMF to receive revocation notification from the NSSAAF.

Based on local policy, the AMF may determine to provide callback URI(s) for receiving re-authentication notification or revocation notification. For example, the callback URIs are provided for an UE identified with low mobility characteristic.

2. The NSSAAF creates slice authentication context for the UE, and starts the slice-specific authentication and authorization procedure. If the AAA-S is involved in slice-specific authentication and authorization procedure, the NSSAAF shall forward the EAP ID response message to the AAA-S. Depending on the result, either step 3a or step 3b is performed.

3a. On success, "201 Created" shall be returned. The "Location" header shall contain the URI of the created resource (e.g., . . . /v1/slice-authentications/{authCtxId}). The payload body shall contain the slice authentication context, which includes the EAP message generated by the NSSAAF or from the AAA-S. The NF service consumer (i.e., the AMF) shall forward the received EAP message to the UE in NAS message, as specified in FIGS. 8 and 9.

3b. On failure, one of the HTTP status code listed in Table 3 below shall be returned with the message body containing a ProblemDetails structure with the "cause" attribute set to one of the application error listed in Table 3. If the slice is not authorized, the NSSAAF shall use the "SLICE_AU-TH_REJECTED" application error code.

5. The NSSAAF checks and confirms the slice-specific authentication and authorization. If the AAA-S is involved, the NSSAAF shall forward the EAP message to the AAA-S to confirm the slice-specific authentication and authorization. Depending on the result, either step 6a or step 6b is performed.

6a. On success, "200 OK" shall be returned. The payload body shall contain the slice authentication confirmation response, which includes the EAP message (e.g., EAP success/failure message) generated by the NSSAAF or from the AAA-S. The NF service consumer (i.e., the AMF) shall forward the EAP message to the UE in NAS message.

If the UE is authenticated, the NSSAAF shall set the "authResult" attribute to "EAP_SUCCESS". If failed to authenticate the UE, the "authResult" attribute shall be set to "EAP_FAILURE".

If subsequent EAP message exchange is needed between the UE and the NSSAAF(AAA-S), the NSSAAF shall not include SliceAuthResult in the response message.

6b. On failure, one of the HTTP status codes listed in Table 3 described above shall be returned with the message body containing a ProblemDetails structure with the "cause" attribute set to one of the application error listed in Table 3.

7-9. If subsequent EAP message exchange is needed between the UE and the NSSAAF to finish the EAP based authentication, step 7-9 are performed.

In above steps, if the AAA-S is involved in the slice-specific authentication and authorization procedure while there is no expected response from the AAA-S in the case of time out, the NSSAAF shall return HTTP status code "504 Gateway Timeout", with the message body containing a ProblemDetails structure with the "cause" attribute set to "TIMED_OUT_REQUEST".

As described above with reference to FIGS. 8 to 11, the NSSAA procedure is a procedure in which the UE additionally performs authentication and authorization for a specific network slice after success of the initial authentication and authorization procedure with the network. When the UE

TABLE 3

| Application Error | HTTP Status Code | Description |
| --- | --- | --- |
| SLICE_AUTH_REJECTED | 403 Forbidden | The user cannot be authenticated, e.g., authentication request rejected by the AAA-s. |
| CONTEXT_NOT_FOUND | 404 Not Found | The NSSAAF cannot find the resource corresponding to the URI provided by the NF service consumer, i.e., the resource identified by the auth CtxID does not exist in the NSSAAF. |
| USER_NOT_FOUND | 404 Not Found | The use does not exist in the HPLMN. |
| UPSTREAM_SERVER_ERROR | 504 Gateway Timeout | Error Happens in reaching the remote peer (i.e., the AAA-S). |
| NETWORK_FAILURE | 504 Gateway Timeout | The request is rejected due to a network problem. |
| TIMED_OUT_REQUEST | 504 Gateway Timeout | No response is received from the remote peer (i.e., the AAA-S) when time out. |

4. Once receiving EAP message from the UE, the NF service consumer (i.e., the AMF) shall send a PUT request to the NSSAAF, targeting the resource of the slice authentication context (i.e. . . . /v1/slice-authentications/{authCtxId}).

The payload body shall carry the slice authentication confirmation data which includes:

UE ID (i.e., GPSI)
S-NSSAI
AAA-S address
EAP Message (which is received from the UE)

performs a registration request, the UE informs the network (e.g., AMF) that the UE supports the NSSAA function. The network (e.g., AMF) determines whether to perform the NSSAA procedure for the S-NSSAI requested by the UE to register, and performs the NSSAA procedure accordingly. If the NSSAA procedure fails, the network notifies the UE of the failure of the NSSAA procedure, and also informs the UE of the Rejected NSSAI for the corresponding S-NSSAI through a UE configuration update command message. The S-NSSAI received through the Rejected NSSAI is stored in the memory of the UE as a Rejected NSSAI until the UE is powered off or the USIM is removed. In addition, the use of the S-NSSAI is prohibited to prevent data transmission using the S-NSSAI to the PLMN that informed the Rejected NSSAI.

The AAA-S may trigger the NSSAA procedure for re-authentication and re-authorization for the S-NSSAI for which authentication and authorization have already been successful. However, for the S-NSSAI rejected because the NSSAA procedure has failed, the AMF cannot request authentication through the NSSAA procedure. In addition, when the UE requests access of a network slice to the network, the Requested NSSAI is transmitted, and the network considers the S-NSSAI included in the Requested NSSAI to be the S-NSSAI for which the UE requests access, the Requested NSSAI does not include the S-NSSAI included in the Rejected NSSAI.

As a result, for the S-NSSAI included in the Rejected NSSAI because the NSSAA procedure has failed due to a network error or timeout, etc., the network does not perform the NSSAA procedure because the UE does not request it, and since the network can also perform re-authentication only for network slices that have already been authenticated and authorized, a network slice rejected due to NSSAA failure cannot be the target of a re-authentication request. Therefore, until the UE is powered off or the USIM is removed, data transmission using the network slice in which the NSSAA procedure has failed to this PLMN is prohibited.

UEs, such as telematics devices, which cannot be powered off or removed from USIM, can operate in a 5G system. For such a UE, there is a possibility that data transmission through the S-NSSAI in which the NSSAA failure occurred is permanently impossible in the corresponding PLMN. In other words, if NSSAA failure occurs due to a temporary network error or time out, etc., even though the probability of success of the NSSAA procedure is high after a certain period of time, if NSSAA failure occurs once for a specific S-NSSAI, the data transmission using the corresponding S-NSSAI is prohibited until the UE is powered off or the USIM is removed. Therefore, when NSSAA fails due to a network error, a method of re-initiating the NSSAA procedure for the network slice corresponding to the S-NSSAI included in the Rejected NSSAI may be required.

Meanwhile, as described above in FIG. 12, when an NSSAA failure occurs during the NSSAA procedure, the AMF receives any one of the HTTP status codes listed in Table 3 from the NSSAAF to know which cause the NSSAA failure occurred, and the AMF may then consider that an NSSAA failure has occurred for the corresponding S-NSSAI. For example, if the AMF receives an HTTP status code set to "4xx" or "5xx" in Table 3, or if AMF detects an NSSAA failure for an S-NSSAI during the NSSAA procedure, the AMF may consider that the NSSAA procedure has failed for the corresponding S-NSSAI.

According to FIGS. 8 and 9, when performing the NSSAA procedure, the AMF may inform the UE of whether the corresponding NSSAA procedure is completed as a result of network slice specific authentication, and in this case, an EAP success message or an EAP failure message may be transmitted. However, if the authentication request message of the NSSAA procedure does not reach the AAA-S due to application errors such as "NETWORK_FAILURE" and/or "TIMED_OUT_REQUEST", it is unclear whether the NSSAAF delivers an EAP failure message to the AMF.

Also, according to RFC3748, if a failure occurs because a response is not received from the AAA-S, the authenticator AAA-S does not forward the failure packet to the NSSAAF. Therefore, in this case, the AMF cannot deliver the EAP failure message to the UE, and the UE cannot know whether the NSSAA procedure has ended. Therefore, when it fails to generate and/or deliver an EAP failure message due to no response, there may be a need for a method for the UE to know how the NSSAA procedure has ended.

The present disclosure proposes a NSSAA handling method when the NSSAAF receives no response as a cause of failure during the NSSAA procedure.

According to the implementation of the present disclosure, with respect to the S-NSSAI included in the Rejected NSSAI when NSSAA fails due to a network error, a method in which the network (e.g., AMF) re-initiates the NSSAA procedure is proposed. If the AAA-S cannot transmit the EAP message due to a network error or time out, a specific network node (e.g., NSSAAF, NRF) stores the status such as whether there is a network error or not, and if the AAA-S is recovered, the NSSAAF or the specific network node may inform the AMF that the AAA-S has been recovered. Upon receiving this, the AMF considers that the AAA-S has been recovered, and the AMF may re-initiate the NSSAA procedure for the corresponding S-NSSAI.

According to the implementation of the present disclosure, a method for the AMF to initiate an NSSAA procedure when NSSAA fails due to a network error is proposed. When the AMF receives the HTTP status code "4xx" or "5xx", the AMF may determine that an NSSAA failure has occurred due to a network error. Also, when the AMF receives the HTTP status code "504" and learns that the AAA-S has been recovered from the NRF, the AMF may re-initiate the NSSAA procedure for the S-NSSAI for which the NSSAA procedure has failed. Thereafter, when NSSAA failure due to a network error occurs again, the AMF may not store the corresponding S-NSSAI in the Rejected NSSAI.

According to the implementation of the present disclosure, when the AMF determines that an NSSAA failure has occurred due to a network error, the AMF may notify the UE. Alternatively, the UE considers that the EAP time out has caused an NSSAA failure due to a network error, and when the EAP time out occurs, the NSAA procedure in progress may be stopped. Afterwards, if the corresponding S-NSSAI is present in the Rejected NSSAI in the configuration update command message, the UE may ignore it as if it did not receive it. Accordingly, the UE may perform access request through the network slice corresponding to the corresponding S-NSSAI.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 13:
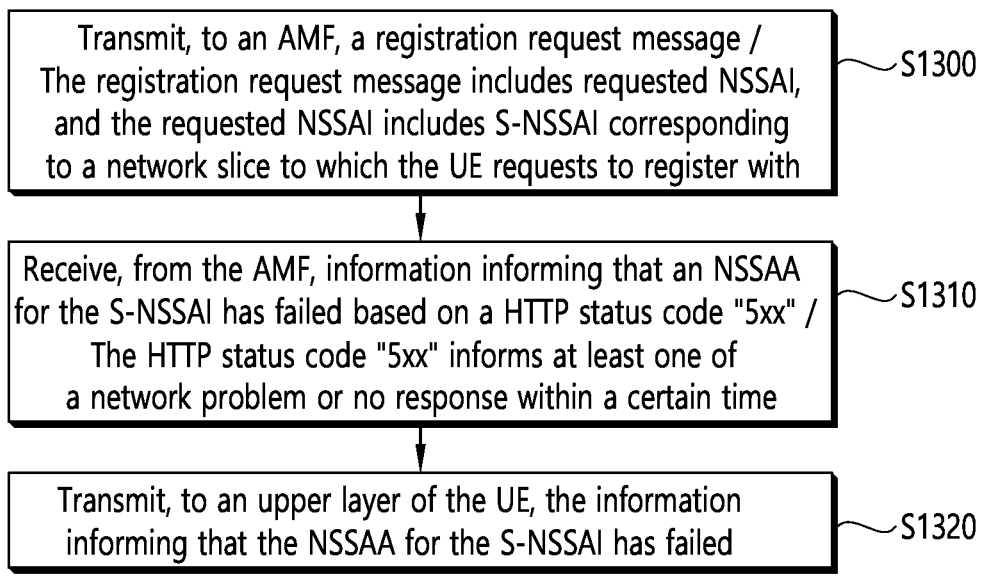
FIG. 13 shows an example of a method performed by a UE to which implementations of the present disclosure are applied.

FIG. 13 shows an example of a method performed by a UE to which implementations of the present disclosure are applied.

In step S1300, the method includes transmitting a registration request message to an AMF. The registration request message includes requested NSSAI, and the requested NSSAI includes S-NSSAI corresponding to a network slice to which the UE requests to register with.

In step S1310, the method includes receiving, from the AMF, information informing that a NSSAA for the S-NSSAI has failed based on a HTTP status code "5xx". The HTTP status code "5xx" informs at least one of a network problem or no response within a certain time.

In some implementations, the information informing that the NSSAA for the S-NSSAI has failed based on the HTTP status code "5xx" may be received via a network slice specific authentication result message.

In step S1320, the method includes delivering, to an upper layer of the UE, the information informing that the NSSAA for the S-NSSAI has failed.

In some implementations, the S-NSSAI may be stored in a rejected NSSAI. Based on the HTTP status code being "504 Gateway timeout", the S-NSSAI stored in the rejected NSSAI may be deleted after certain time according to a local configuration. Thereafter, the S-NSSAI deleted from the rejected NSSAI may be stored in the requested NSSAI, and a registration request message including the requested NSSAI may be transmitted to the AMF.

In some implementations, the UE may communicate with at least one of a mobile device, a network and/or an autonomous vehicle other than the UE.

Furthermore, the method in perspective of the UE described above in FIG. 13 may be performed by the first wireless device 100 shown in FIG. 2, the wireless device 100 shown in FIG. 3, and/or the UE 100 shown in FIG. 4.

More specifically, the UE comprises at least one transceiver, at least one processor, and at least one memory operably connectable to the at least one processor. The at least one memory stores instructions that, based on being executed by the at least one processor, perform operations below.

The UE transmits, via the at least one transceiver, a registration request message to an AMF. The registration request message includes requested NSSAI, and the requested NSSAI includes S-NSSAI corresponding to a network slice to which the UE requests to register with.

The UE receives, from the AMF, information informing that a NSSAA for the S-NSSAI has failed based on a HTTP status code "5xx". The HTTP status code "5xx" informs at least one of a network problem or no response within a certain time.

In some implementations, the information informing that the NSSAA for the S-NSSAI has failed based on the HTTP status code "5xx" may be received via a network slice specific authentication result message.

The UE deliveres, to an upper layer of the UE, the information informing that the NSSAA for the S-NSSAI has failed.

In some implementations, the S-NSSAI may be stored in a rejected NSSAI. Based on the HTTP status code being "504 Gateway timeout", the S-NSSAI stored in the rejected NSSAI may be deleted after certain time according to a local configuration. Thereafter, the S-NSSAI deleted from the rejected NSSAI may be stored in the requested NSSAI, and a registration request message including the requested NSSAI may be transmitted to the AMF.

Furthermore, the method in perspective of the UE described above in FIG. 13 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus configured to operate in a wireless communication system comprises at least one processor, and at least one memory operably connectable to the at least one processor. The at least one processor is configured to perform operations comprising: generating a registration request message, wherein the registration request message includes requested NSSAI, and wherein the requested NSSAI includes S-NSSAI corresponding to a network slice to which the UE requests to register with; obtaining information informing that a NSSAA for the S-NSSAI has failed based on a HTTP status code "5xx", wherein the HTTP status code "5xx" informs at least one of a network problem or no response within a certain time; and delivering, to an upper layer of the UE, the information informing that the NSSAA for the S-NSSAI has failed.

Furthermore, the method in perspective of the UE described above in FIG. 13 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: generating a registration request message, wherein the registration request message includes requested NSSAI, and wherein the requested NSSAI includes S-NSSAI corresponding to a network slice to which the UE requests to register with; obtaining information informing that a NSSAA for the S-NSSAI has failed based on a HTTP status code "5xx", wherein the HTTP status code "5xx" informs at least one of a network problem or no response within a certain time; and delivering, to an upper layer of the UE, the information informing that the NSSAA for the S-NSSAI has failed.

Figure 14:
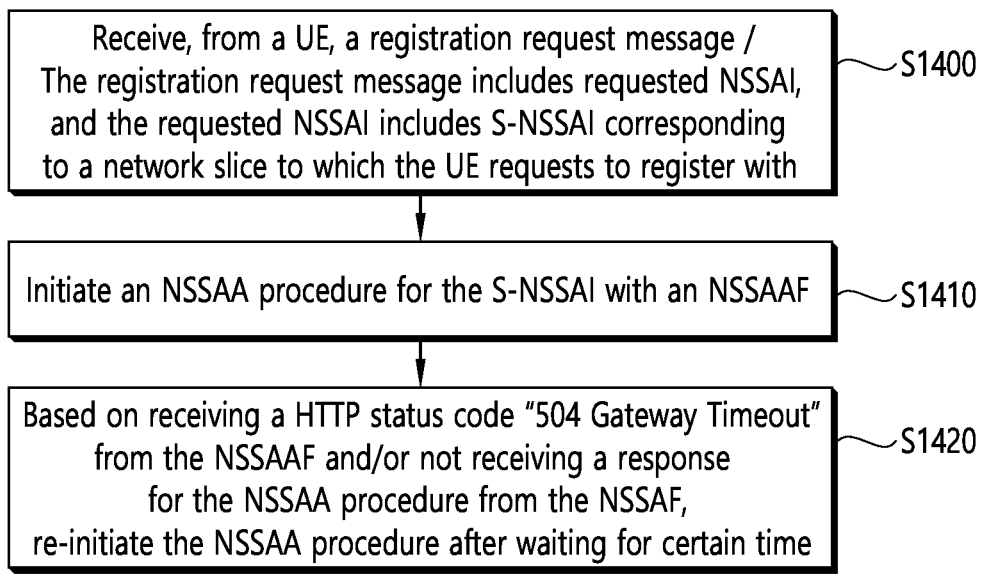
FIG. 14 shows an example of a method performed by an AMF to which implementations of the present disclosure are applied.

FIG. 14 shows an example of a method performed by an AMF to which implementations of the present disclosure are applied.

In step S1400, the method includes receiving a registration request message from a UE. The registration request message includes requested NSSAI, and the requested NSSAI includes S-NSSAI corresponding to a network slice to which the UE requests to register with.

In step S1410, the method includes initiating a NSSAA procedure for the S-NSSAI with an NSSAAF.

In step S1420, based on receiving a HTTP status code "504 Gateway Timeout" from the NSSAAF and/or not receiving a response for the NSSAA procedure from the NSSAF, the method includes re-initiating the NSSAA procedure after waiting for certain time.

In some implementations, waiting for the certain time may comprise running a timer and waiting until the timer expires.

In some implementations, the method may further comprise storing the S-NSSAI in a rejected NSSAI. Furthermore, the method may further comprise receiving information informing that a failure at the NSSAAF has been recovered from an NRF. The method may further comprise deleting the stored S-NSSAI from the rejected NSSAI based on the information informing that the failure at the NSSAAF has been recovered, and re-initiating the NSSAA procedure for the S-NSSAI.

Various implementations and/or embodiments of the present disclosure are described below. Various implementations and/or embodiments of the present disclosure to be described below may be performed individually, or two or more may be combined and performed complexly.

1. First Implementation

According to the first implementation of the present disclosure, when an NSSAA failure occurs based on a network error in the AAA-S and/or no response due to time out, etc., and when the NSSAAF informs the AMF this, the AMF may store the NSSAA failure cause received from the NSSAAF.

For example, the AMF may store the NSSAA failure cause received from the NSSAAF according to the structures of Tables 4 and 5 below.

when the timer expires, the AMF may re-initiate the NSSAA procedure for the corresponding S-NSSAI. When the corresponding timer expires and the NSSAA procedure is re-initiated for the corresponding S-NSSAI, the AMF may delete the S-NSSAI related to the corresponding timer from the Rejected NSSAI. If the UE is powered off or the SIM card is removed while the timer is running, the AMF may delete the timer and the S-NSSAI related to the corresponding timer may be deleted from the Rejected NSSAI.

For example, when the AMF receives the HTTP status code "403 forbidden" as the NSSAA failure cause, the AMF may consider that an NSSAA failure has occurred for the corresponding S-NSSAI, and may store the corresponding S-NSSAI in the Rejected NSSAI.

2. Second Implementation

According to the second implementation of the present disclosure, when an NSSAA failure occurs based on a network error in the AAA-S and/or no response due to time out, etc., and when the NSSAAF informs the AMF this, the AMF may store the NSSAA failure cause received from the NSSAAF.

When the AMF receives the HTTP status code "504 Gateway timeout" as the NSSAA failure cause, the AMF may store the corresponding S-NSSAI in the Rejected NSSAI. Thereafter, after a certain time or according to the configuration of the AMF, the AMF may re-initiate the NSSAA procedure for the corresponding S-NSSAI.

If the result of performing the NSSAA procedure for the corresponding S-NSSAI again is EAP success, the AMF uses the UE configuration update command message to put the corresponding S-NSSAI previously stored in the

TABLE 4

| Attribute name | Data type | P | Cardinality | Description |
| --- | --- | --- | --- | --- |
| snssai | Snssai | M | 1 | Subscribed S-NSSAI |
| status | AuthStatus | M | 1 | This flag when present shall indicate the NSSAA status of the related Snssai. |
| FailureCause | AuthFailureCause | O | 1 | It indicates ProblemDetails which is received from NSSAAF.<br>504 Gateway timeout<br>404 Not found<br>403 forbidden<br>400 bad request<br>It is applicable only for AuthStatus set to "EAP_FAILURE". |

TABLE 5

| Enumeration value | Description |
| --- | --- |
| "504 Gateway timeout" | The NSSAA AuthFailureCause is "504 Gateway timeout". |
| "404 Not found" | The NSSAA AuthFailureCause is "404 Not found". |
| "403 forbidden" | The NSSAA AuthFailureCause is "504 Gateway timeout". |
| "400 bad request" | The NSSAA AuthFailureCause is "504 Gateway timeout". |

For example, when the AMF receives from the NSSAAF an NSSAA failure cause, e.g., HTTP status code "5xx", the AMF may store the received NSSAA failure cause, and check what is the NSSAA failure cause. The AMF may operate according to the NSSAA failure cause.

For example, when the AMF receives HTTP status code "504 Gateway timeout" as the NSSAA failure cause, the AMF may start a timer for a certain amount of time by S-NSSAI-specific or UE-specific or network policy, and Rejected NSSAI into the Allowed NSSAI and transmit it to the UE. Upon receiving the Allowed NSSAI via the UE configuration update command message, the UE may normally perform data transmission/reception through the corresponding S-NSSAI.

In addition, the AMF may store the NSSAA failure cause received from the NSSAAF, and check what the NSSAA failure cause is. AMF may operate according to the NSSAA failure cause.

That is, according to the second implementation of the present disclosure, an NSSAA procedure may be initiated for one or more S-NSSAIs stored in the Rejected NSSAI for NSSAA that failed based on network policy and/or AAA-S recovery.

3. Third Implementation

According to the third implementation of the present disclosure, when an NSSAA failure occurs based on a network error in the AAA-S and/or no response due to time out, etc., and when the NSSAAF informs the AMF this, the AMF may store the NSSAA failure cause received from the NSSAAF, and deliver the stored NSSAA failure cause to the UE.

The UE may receive the NSSAA failure cause, and inform the upper layer of the received NSSAA failure cause. Thereafter, the UE may manage the NSSAI storage according to the NSSAA failure cause.

When the NSSAA failure cause received by the UE is "504 Gateway timeout", the upper layer of the UE may delete the corresponding S-NSSAI stored in the Rejected NSSAI according to the local configuration of the UE after a certain period of time. Thereafter, the UE may store the corresponding S-NSSAI in the Requested NSSAI again to perform a connection request.

In addition, the UE may receive the NSSAA failure cause, and use different timer values according to different NSSAA failure causes.

4. Fourth Implementation

According to the fourth implementation of the present disclosure, when the NSSAAF receives no response to NSSAA procedure and transmits HTTP status code "504 Gateway timeout" to the AMF, the AMF may transmit an indicator indicating that an NSSAA failure has occurred based on no response to the UE. Upon receiving the indicator, the UE may be aware that the NSSAA procedure has ended in a failed state, similar to receiving an EAP failure.

For example, upon receiving the HTTP status code "5xx" from the NSSAAF, the AMF may set the NSSAA failure indicator in the network slice specific authentication result message. Upon receiving the NSSAA failure indicator of the network slice specific authentication result message, the UE may consider that the network slice specific EAP result has failed. Upon receiving the network slice specific authentication result message, the UE may forward the following to an upper layer.

a) the EAP-success or EAP-failure message received in the EAP message IE; and
b) the HPLMN S-NSSAI in the S-NSSAI IE; and
c) the NSSAA Failure indicator Apart from this operation, the NSSAA procedure is transparent to the 5GMM layer of the UE.

Table 6 shows an example of a network slice specific authentication result message including an NSSAA failure indicator according to the fourth implementation of the present disclosure.

TABLE 6

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | NETWORK SLICE-SPECIFIC AUTHENTICATION RESULT message identity | Message type 9.7 | M | V | 1 |
| | S-NSSAI | S-NSSAI 9.11.2.8 | M | LV | 2-5 |
| | EAP message | EAP message 9.11.2.2 | O | LV-E | 6-1502 |
| F- | NSSAA Failure indicator | NSSAA Failure indicator 9.11.2.10 | O | TV | 1 |

Referring to Table 6, the network slice specific authentication result message includes an NSSAA Failure indicator.

Table 7 and Table 8 show an example of coding of the NSSAA failure indicator IE according to the fourth implementation of the present disclosure. The purpose of the NSSAA failure indicator IE is to indicate that the NSSAA procedure has failed based on no response from the AAA-S. The NSSAA failure indicator is a type 1 IE.

TABLE 7

| 8 | 7 | 6 | 5 | 4 | 3 | 2 | 1 |
|---|---|---|---|---|---|---|---|
| NSSAA Failure indication IEI | | | | 0 Spare | 0 Spare | 0 Spare | NFI | octet 1 |

TABLE 8

NSSAA Failure indication (NFI) (octet 1)

Bit 0  reserved
1  NSSAA Failed due to no response from AAA-S
Bits 2, 3 and 4 are spare and shall be coded as zero, 5. Fifth Implementation According to the fifth implementation of the present disclosure, when an NSSAA failure occurs based on a network error in the AAA-S and/or no response due to time out, etc., a new network node that is neither the NSSAAF nor the AMF may store and manage the NSSAA failure cause. The new network node may be a network node that manages the state of AAA-S for the NSSAA procedure.

When the new network node recognizes that the AAA-S has been recovered again, the new network node may inform the NSSAAF or the AMF that the AAA-S has been recovered. When the AMF recognizes that the AAA-S has been recovered, the AMF may perform the NSSAA procedure again.

6. Sixth Implementation

According to the sixth implementation of the present disclosure, when the NSSAAF receives no response to the NSSAA procedure and transmits the HTTP status code "504 Gateway timeout" to the AMF, the NSSAAF may generate an EAP failure message, and delivered to the AMF.

The present disclosure can have various advantageous effects.

For example, even if an NSSAA failure occurs due to a network error in AAA-S, etc., the AMF can start the NSSAA procedure again.

For example, in case of a network error, data transmission can be performed for a corresponding network slice.

For example, even if the NSSAA procedure fails once, the S-NSSAI can be used again after a certain period of time.

For example, even if the UE does not move to a new PLMN, data can be transmitted again using the S-NSSAI that has failed once.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by an Access and mobility Management Function (AMF) adapted to operate in a wireless communication system, the method comprising:
receiving a registration request message from a User Equipment (UE),
wherein the registration request message includes requested Network Slice Selection Assistance Information (NSSAI) corresponding to a network slice to which the UE intends to register with, and
wherein the requested NSSAI contains Single NSSAI (S-NSSAI);
transmitting a registration accept message to the UE;
initiating a Network Slice-Specific Authentication and Authorization (NSSAA) procedure for the S-NSSAI,
wherein the NSSAA procedure is performed with a Network Slice-Specific Authentication and Authorization Function (NSSAAF);
receiving a response with a HyperText Transfer Protocol (HTTP) status code "504 Gateway Timeout" from the NSSAAF,
wherein the HTTP status code "504 Gateway Timeout" is received based on an Authentication, Authorization and Accounting Server (AAA-S) being involved in the NSSAA procedure while there is no expected response from the AAA-S in case of timeout, with a message body containing a ProblemDetails structure with a cause attribute set to "TIMED_OUT_REQUEST"; and
based on the NSSAA procedure being unable to be completed due to receiving the response with the HTTP status code "504 Gateway Timeout," re-initiating the NSSAA procedure after waiting for certain time.

2. The method of claim 1, wherein the waiting for the certain time comprises running a timer and waiting until the timer expires.

3. The method of claim 1, wherein the method further comprises storing the S-NSSAI in a rejected NSSAI.

4. The method of claim 3, wherein the method further comprises:
receiving information informing that a failure at the NSSAAF has been recovered from a Network Repository Function (NRF); and
deleting the stored S-NSSAI from the rejected NSSAI based on the information informing that the failure at the NSSAAF has been recovered; and
re-initiating the NSSAA procedure for the S-NSSAI.

5. An Access and mobility Management Function (AMF) adapted to operate in a wireless communication system, the AMF comprising:
at least one processor; and
at least one memory operably connectable to the at least one processor and storing instructions that, based on being executed by the at least one processor, perform operations comprising:
receiving a registration request message from a User Equipment (UE),
wherein the registration request message includes requested Network Slice Selection Assistance Information (NSSAI) corresponding to a network slice to which the UE intends to register with, and
wherein the requested NSSAI contains Single NSSAI (S-NSSAI);
initiating a Network Slice-Specific Authentication and Authorization (NSSAA) procedure for the S-NSSAI,
wherein the NSSAA procedure is performed with a Network Slice-Specific Authentication and Authorization Function (NSSAAF);
receiving a response with HyperText Transfer Protocol (HTTP) status code "504 Gateway Timeout" from the NSSAAF and/or not receiving a response for the NSSAA procedure from the NSSAAF,
wherein the HTTP status code "504 Gateway Timeout" is received based on an Authentication, Authorization and Accounting Server (AAA-S) being involved in the NSSAA procedure while there is no expected response from the AAA-S in case of timeout, with a message body containing a ProblemDetails structure with a cause attribute set to "TIMED_OUT_REQUEST"; and
based on the NSSAA procedure being unable to be completed due to receiving the response with the HTTP status code "504 Gateway Timeout," re-initiating the NSSAA procedure after waiting for certain time.

6. The AMF of claim 5, wherein the waiting for the certain time comprises running a timer and waiting until the timer expires.

7. The AMF of claim 5, wherein the operations further comprise storing the S-NSSAI in a rejected NSSAI.

8. The AMF of claim 7, wherein the operations further comprise:
receiving information informing that a failure at the NSSAAF has been recovered from a Network Repository Function (NRF); and deleting the stored S-NSSAI from the rejected NSSAI based on the information informing that the failure at the NSSAAF has been recovered; and re-initiating the NSSAA procedure for the S-NSSAI.

9. A method performed by a User Equipment (UE) adapted to operate in a wireless communication system, the method comprising:

transmitting a registration request message to an Access and Mobility Management Function (AMF), wherein the registration request message includes requested Network Slice Selection Assistance Information (NSSAI) corresponding to a network slice to which the UE intends to register with, and wherein the requested NSSAI contains Single NSSAI (S-NSSAI); and receiving a registration accept message from the AMF, wherein a Network Slice-Specific Authentication and Authorization (NSSAA) procedure for the S-NSSAI is initiated by an Access and mobility Management Function (AMF), wherein the NSSAA procedure is performed with a Network Slice-Specific Authentication and Authorization Function (NSSAAF);

wherein a response with a HyperText Transfer Protocol (HTTP) status code "504 Gateway Timeout" is received by the AMF from the NSSAAF, wherein the HTTP status code "504 Gateway Timeout" is received based on an Authentication, Authorization and Accounting Server (AAA-S) being involved in the NSSAA procedure while there is no expected response from the AAA-S in case of timeout, with a message body containing a ProblemDetails structure with a cause attribute set to "TIMED_OUT_REQUEST," and wherein, based on the NSSAA procedure being unable to be completed due to receiving the response with the HTTP status code "504 Gateway Timeout", the NSSAA procedure is re-initiated after waiting for certain time.

* * * * *